United States Patent
Nozaki et al.

(10) Patent No.: US 11,352,453 B2
(45) Date of Patent: *Jun. 7, 2022

(54) CATALYST FOR OLEFIN POLYMERIZATION AND PRODUCTION METHOD FOR POLAR GROUP-CONTAINING OLEFIN-BASED POLYMERS

(71) Applicants: THE UNIVERSITY OF TOKYO, Tokyo (JP); SHOWA DENKO K. K., Tokyo (JP); JAPAN POLYETHYLENE CORPORATION, Tokyo (JP)

(72) Inventors: Kyoko Nozaki, Tokyo (JP); Shingo Ito, Tokyo (JP); Junichi Kuroda, Oita (JP); Yoshikuni Okumura, Oita (JP); Shinya Hayashi, Oita (JP); Yumiko Minami, Tokyo (JP); Minoru Kobayashi, Yokkaichi (JP); Yuichiro Yasukawa, Kawasaki (JP)

(73) Assignees: THE UNIVERSITY OF TOKYO, Tokyo (JP); SHOWA DENKO K.K., Tokyo (JP); JAPAN POLYETHYLENE CORPORATION, Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 16/762,595

(22) PCT Filed: Nov. 7, 2018

(86) PCT No.: PCT/JP2018/041310
§ 371 (c)(1),
(2) Date: May 8, 2020

(87) PCT Pub. No.: WO2019/093364
PCT Pub. Date: May 16, 2019

(65) Prior Publication Data
US 2020/0347159 A1    Nov. 5, 2020

(30) Foreign Application Priority Data

Nov. 9, 2017 (JP) .............................. JP2017-216585

(51) Int. Cl.
| | | |
|---|---|---|
| *C08F 4/80* | (2006.01) | |
| *C07F 15/00* | (2006.01) | |
| *C08F 16/38* | (2006.01) | |
| *C08F 4/70* | (2006.01) | |
| *C08F 218/02* | (2006.01) | |

(52) U.S. Cl.
CPC ............ *C08F 16/38* (2013.01); *C07F 15/006* (2013.01); *C08F 4/80* (2013.01); *C08F 4/7031* (2013.01); *C08F 218/02* (2013.01)

(58) Field of Classification Search
CPC ......... C08F 4/7031; C08F 4/80; C08F 218/02
See application file for complete search history.

(56) References Cited

U.S. PATENT DOCUMENTS

| | | | |
|---|---|---|---|
| 6,897,275 B2 * | 5/2005 | Wang | ................... C07F 9/5009 526/161 |
| 8,916,663 B2 | 12/2014 | Nozaki et al. | |
| 9,303,101 B2 | 4/2016 | Nozaki et al. | |
| 2021/0054117 A1 | 2/2021 | Ito et al. | |

FOREIGN PATENT DOCUMENTS

| | | |
|---|---|---|
| EP | 3 757 140 A1 | 12/2020 |
| JP | 2004-502652 A | 1/2004 |
| JP | 2005-505649 A | 2/2005 |
| JP | 2011-068881 A | 4/2011 |
| JP | 2014-159540 A | 9/2014 |
| WO | 01/92342 A2 | 12/2001 |
| WO | 03/031485 A2 | 4/2003 |

(Continued)

OTHER PUBLICATIONS

R. C. Laible, "Allyl Polymerizations", Chem. Rev. 1958, pp. 807-843, 58.
Shingo Ito et al., "Coordination—Insertion Copolymerization of Allyl Monomers with Ethylene", J. Am. Chem. Soc., 2011, pp. 1232-1235, vol. 133.
Takuya Kochi et al., "Formation of Linear Copolymers of Ethylene and Acrylonitrile Catalyzed by Phosphine Sulfonate Palladium Complexes", J. Am. Chem. Soc., 2007, pp. 8948-8949, vol. 129.

(Continued)

*Primary Examiner* — Rip A Lee
(74) *Attorney, Agent, or Firm* — Sughrue Mion, PLLC

(57) ABSTRACT

A catalyst for olefin polymerization that contains a metal complex represented by general formula (C1) and a method for producing polyethylene, a copolymer of ethylene and an olefin having a polar group represented by general formula (1), or a copolymer of ethylene, an olefin having a polar group represented by general formula (1) and another monomer, using the aforementioned metal complex as a polymerization catalyst, wherein the symbols in formula (C1) and formula (1) are as defined in the specification.

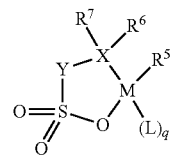

$$CH_2=CH-(CH_2)_n-R^1 \qquad (1)$$

13 Claims, 1 Drawing Sheet

(56) References Cited

FOREIGN PATENT DOCUMENTS

WO     2013/168626 A1    11/2013
WO     2014/115895 A1    7/2014

OTHER PUBLICATIONS

International Search Report for PCT/JP2018/041310, dated Feb. 12, 2019.
Communication dated Jul. 20, 2021 by the European Patent Office in application No. 18876532.5.

* cited by examiner

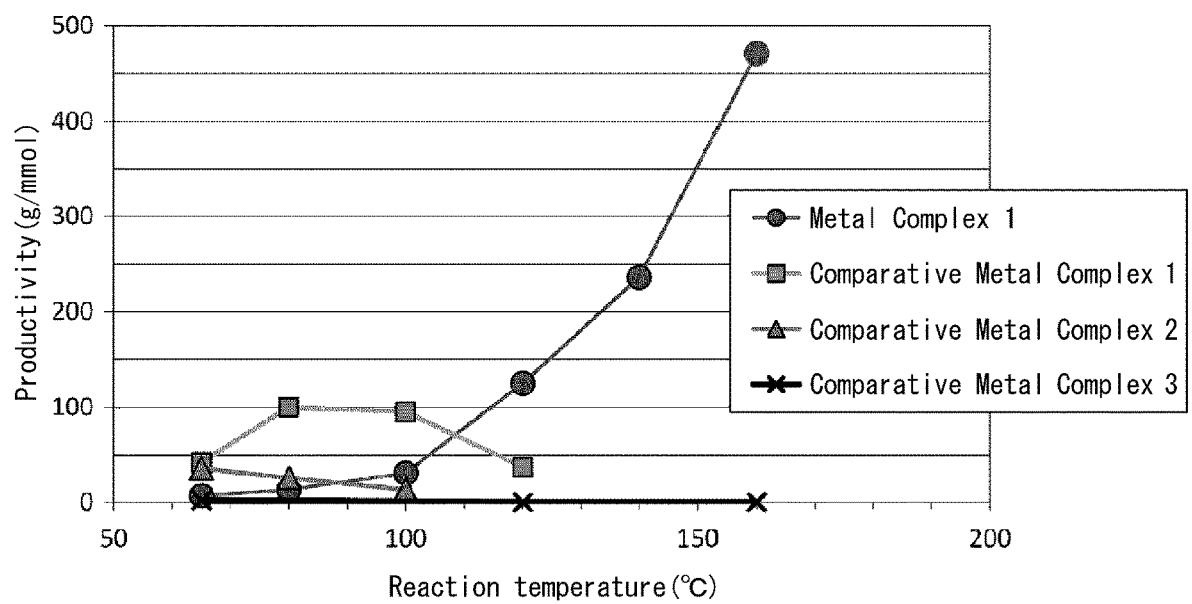

CATALYST FOR OLEFIN POLYMERIZATION AND PRODUCTION METHOD FOR POLAR GROUP-CONTAINING OLEFIN-BASED POLYMERS

CROSS REFERENCE TO RELATED APPLICATIONS

This application is a National Stage of International Application No. PCT/JP2018/041310 filed Nov. 7, 2018, claiming priority based on Japanese Patent Application No. 2017-216585 filed Nov. 9, 2017.

FIELD

The present invention relates to a catalyst for olefin polymerization and a production method for olefin-based polymers, and particularly polymers from polar group-containing monomers such as allyl compounds having a polar group.

BACKGROUND

Copolymers of olefins such as ethylene and propylene, which are nonpolar monomers, and vinyl monomers having a polar group, have functionality and characteristics not found in nonpolar polyethylene or polypropylene, and are used in a wide range of fields. Ethylene-vinyl alcohol copolymers (EVOH), in particular, are copolymers having an ethylene monomer structural unit and a vinyl alcohol monomer structural unit, and are produced by saponification of an ethylene-vinyl acetate copolymer obtained by radial polymerization of ethylene and vinyl acetate. EVOH is used in a wide range of fields, such as food packaging applications, by taking advantage of the superior gas impermeability thereof.

On the other hand, polymerization of monomers having an allyl group is difficult in comparison with ordinary vinyl monomers and there are hardly any such polymers known. The main reason for this is that, in the case of having radically polymerized a monomer having an allyl group, the growth reaction of the polymer is extremely slow due to a degradative chain transfer reaction of the monomer attributable to extraction of the hydrogen atom present at the location of the allylic carbon, thereby only allowing the obtaining of oligomers having a low degree of polymerization (Chem. Rev. 58, 808 (1958): NPL1).

Japanese Unexamined Patent Publication No. 2011-68881 (U.S. Pat. No. 8,916,663: PTL1), International Patent Publication No. WO 2013/168626 (U.S. Pat. No. 9,303,101: PTL2) and J. Am. Chem. Soc., 133, 1232 (2011) (NPL2) indicate coordination polymerization of ethylene and a polar group-containing allyl monomer using a metal complex catalyst of group 10 of the periodic table, and succeed in synthesizing a copolymer of a polar group-containing allyl monomer not able to be obtained by radical polymerization. However, from the viewpoint of catalyst cost, catalytic activity and polymer productivity per unit catalyst are inadequate, and problems remain in terms of achieving industrialization.

One example of a method for increasing catalytic activity is raising the reaction temperature. In an ordinary reaction, the reaction rate constant increases exponentially when the reaction temperature is raised as indicated by the Arrhenius equation indicated below. For example, the reaction rate is typically known to roughly double if the reaction temperature rises by 10° C.:

$k = A \exp(-Ea/RT)$ wherein, k represents the reaction rate constant, A represents a frequency factor, Ea represents activation energy. R represents the gas constant and T represents the reaction temperature.

Although the result of polymerization when the reaction temperature is raised is also described in the aforementioned PTL1, polymer productivity per unit catalyst decreases in polymerization reactions at 120° C. or higher. This was caused by degradation and deactivation of the metal complex catalyst used for polymerization under high temperature conditions, thus indicating a problem with insufficient heat resistance of the catalyst.

CITATION LIST

Patent Literature

[PTL1] Japanese Unexamined Patent Publication No. 2011-68881 (U.S. Pat. No. 8,916,663)
[PTL2] International Publication No. WO 2013/168626 (U.S. Pat. No. 9,303,101)

Non-Patent Literature

[NPL1] Chem. Rev., 58, 808 (1958)
[NPL2] J. Am. Chem. Soc., 133, 1232 (2011)

SUMMARY

Technical Problem

An object of the present invention is to provide a production method for olefin-based polymers having a polar group that can be used in various applications with high catalytic activity by using a catalyst having high heat resistance.

Solution to Problem

As a result of conducting extensive studies to solve the aforementioned problems, the inventors of the present invention found that, by copolymerizing a vinyl monomer (nonpolar olefin) alone such as ethylene and propylene, or the aforementioned nonpolar olefin and a polar group-containing olefin (including allyl monomers having a polar group), using as catalyst a novel metal complex of group 10 of the periodic table having high heat resistance, an olefin-based polymer having a polar group that can be applied in various applications can be produced with high catalytic activity, thereby leading to completion of the present invention.

Namely, the present invention relates to the polymer production method described in [1] to [11] indicated below.

[1] A catalyst for olefin polymerization containing a metal complex represented by the following general formula (C1):

(C1)

wherein, M represents an element of group 10 of the periodic table, X represents a phosphorous atom (P) or arsenic atom (As), Y represents a divalent group selected from a substituted or unsubstituted methylene group (—$CH_2$—), substituted or unsubstituted imino group (—NH—), oxy group (—O—) and substituted or unsubstituted silylene group (—$SiH_2$—), $R^5$ represents a substituent selected from the group consisting of a hydrogen atom, halogen atom, hydrocarbon group having 1 to 30 carbon atoms, hydrocarbon group having 1 to 30 carbon atoms substituted with a halogen atom, hydrocarbon group having 2 to 30 carbon atoms substituted with an alkoxy group having 1 to 10 carbon atoms, hydrocarbon group having 7 to 30 carbon atoms substituted with an aryloxy group having 6 to 20 carbon atoms, hydrocarbon group having 3 to 30 carbon atoms substituted with an amido group having 2 to 10 carbon atoms, alkoxy group having 1 to 30 carbon atoms, aryloxy group having 6 to 30 carbon atoms, and acyloxy group having 2 to 10 carbon atoms, $R^6$ and $R^7$ respectively and independently represent an alkoxy group, aryloxy group, silyl group, amino group or hydrocarbon group having 1 to 120 carbon atoms optionally substituted with one or more substituents selected from a halogen atom, alkoxy group and aryloxy group, at least one of $R^6$ and $R^7$ represents a tertiary alkyl group represented by general formula (2):

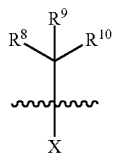

(2)

wherein, $R^8$, $R^9$ and $R^{10}$ respectively and independently represent a hydrocarbon group having 1 to 30 carbon atoms, $R^8$, $R^9$ and $R^{10}$ may respectively bond to form a ring structure, and in the formula, bonds between the carbon atom and X in general formula (C1) are also indicated, $R^6$ and $R^7$ may respectively bond to form a ring structure, L represents an electron donating ligand, and q represents 0, ½, 1 or 2.

[2] The catalyst for olefin polymerization described in 1 above, wherein $R^6$ and $R^7$ respectively and independently represent a tertiary alkyl group represented by general formula (2).

[3] The catalyst for olefin polymerization described in 1 or 2 above, wherein the tertiary alkyl group represented by general formula (2) is a t-butyl group, 1-adamantyl group, 2-methyl-2-butyl group, 2-methyl-2-pentyl group, 2-benzyl-2-propyl group, 2,5-dimethyl-2-hexyl group, 3-methyl-3-pentyl group or 2,3,3-trimethyl-2-butyl group.

[4] The catalyst for olefin polymerization described in any of 1 to 3 above, wherein Y in general formula (C1) represents a methylene group.

[5] A production method, characterized by the use as polymerization catalyst of a metal complex represented by general formula (C1):

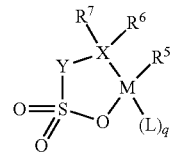

(C1)

wherein, the symbols in the formula having the same meanings as the description of 1 above, for polyethylene, a copolymer of ethylene and an olefin having a polar group represented by general formula (1):

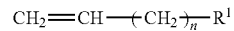

(1)

wherein, $R^1$ represents a substituent selected from the group consisting of a hydroxy group, alkoxy group having 1 to 10 carbon atoms, aryloxy group having 6 to 20 carbon atoms, acyl group having 2 to 10 carbon atoms, ester group having 2 to 10 carbon atoms (oxycarbonyl group: R—O—(C=O)—, where R represents an organic group), acyloxy group having 2 to 10 carbon atoms, amino group, substituted amino group having 1 to 12 carbon atoms, substituted amido group having 2 to 12 carbon atoms, substituted pyridyl group having 5 to 10 carbon atoms, substituted pyrrolidyl group having 4 to 10 carbon atoms, substituted piperidyl group having 5 to 10 carbon atoms, substituted hydrofuryl group having 4 to 10 carbon atoms, substituted imidazolyl group having 4 to 10 carbon atoms, mercapto group, alkylthio group having 1 to 10 carbon atoms, arylthio group having 6 to 10 carbon atoms, epoxy group and a halogen atom, and n represents 0 or an arbitrary integer selected from 1 to 6, or a copolymer of ethylene, an olefin having a polar group represented by the aforementioned formula (1) and another monomer.

[6] The production method for a polymer described in 5 above, wherein n in general formula (1) represents 0.

[7] The production method for a polymer described in 5 above, wherein n in general formula (1) represents 1.

[8] The production method for a polymer described in any of 5 to 7 above, wherein $R^6$ and $R^7$ respectively and independently represent a tertiary alkyl group represented by general formula (2).

[9] The production method for a polymer described in any of 5 to 8 above, wherein the tertiary alkyl group represented by general formula (2) is a t-butyl group, 1-adamantyl group, 2-methyl-2-butyl group, 2-methyl-2-pentyl group, 2-benzyl-2-propyl group, 2,5-dimethyl-2-hexyl group, 3-methyl-3-pentyl group or 2,3,3-trimethyl-2-butyl group.

[10] The production method for a polymer described in any of 5 to 9 above, wherein Y in general formula (C1) represents a methylene group.

[11] The production method for a polymer described in any of 5 to 10 above, wherein the polymerization temperature is 100-180° C.

Advantageous Effects of Invention

According to the present invention, an olefin-based polymer having a polar group able to be used in various applications can be produced at low cost by copolymerizing a nonpolar olefin (ethylene) and an olefin having a polar group, such as an allyl monomer having a polar group at a high temperature, using a metal complex of group 10 of the periodic table having heat resistance and high catalytic activity as a catalyst.

BRIEF DESCRIPTION OF DRAWINGS

FIG. 1 is a graph in which productivity is plotted versus reaction temperature for polymerization in Examples 2 to 7 and Comparative Examples 1 to 10 using Metal Complex 1 and Comparative Metal Complexes 1 to 3.

DESCRIPTION OF EMBODIMENTS

[Catalyst]

The catalyst (structure thereof) comprised of a metal complex of group 10 of the periodic table used in the present invention is represented by general formula (C1).

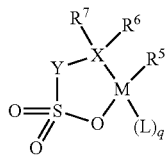

(C1)

In the formula. M represents an element of group 10 of the periodic table, X represents a phosphorous atom (P) or arsenic atom (As). Y represents a functional group selected from a substituted or unsubstituted methylene group (—$CH_2$—), substituted or unsubstituted imino group (—NH—), oxy group (—O—) and substituted or unsubstituted silylene group (—$SiH_2$—), $R^5$ represents a substituent selected from the group consisting of a hydrogen atom, halogen atom, hydrocarbon group having 1 to 30 carbon atoms, hydrocarbon group having 1 to 30 carbon atoms substituted with a halogen atom, hydrocarbon group having 2 to 30 carbon atoms substituted with an alkoxy group having 1 to 10 carbon atoms, hydrocarbon group having 7 to 30 carbon atoms substituted with an aryloxy group having 6 to 20 carbon atoms, hydrocarbon group having 3 to 30 carbon atoms substituted with an amido group having 2 to 10 carbon atoms, alkoxy group having 1 to 30 carbon atoms, aryloxy group having 6 to 30 carbon atoms, and acyloxy group having 2 to 10 carbon atoms, $R^6$ and $R^7$ respectively and independently represent an alkoxy group, aryloxy group, silyl group, amino group or hydrocarbon group having 1 to 120 carbon atoms optionally substituted with one or more substituents selected from a halogen atom, alkoxy group and aryloxy group, at least one of $R^6$ and $R^7$ represents a tertiary alkyl group represented by general formula (2):

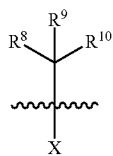

(2)

wherein, $R^8$, $R^9$ and $R^{10}$ respectively and independently represent an alkoxy group, aryloxy group, silyl group, amino group or hydrocarbon group having 1 to 30 carbon atoms optionally substituted with one or more groups selected from a halogen atom, alkoxy group and aryloxy group, $R^8$, $R^9$ and $R^{10}$ may respectively bond to form a ring structure, and in the formula, bonds between the carbon atom and X in general formula (C1) are also indicated, $R^6$ and $R^7$ may respectively bond to form a ring structure, L represents an electron donating ligand, and q represents 0, ½, 1 or 2.

In the present description, "hydrocarbon" includes saturated or unsaturated aliphatic hydrocarbons and aromatic hydrocarbons.

The following provides an explanation of the structure of general formula (C1).

M represents an element of group 10 of the periodic table. Although examples of an element of group 10 of the periodic table include Ni, Pd and Pt, from the viewpoints of catalytic activity and molecular weight of the resulting polymer, Ni and Pd are preferable and Pd is more preferable.

X represents a phosphorous atom (P) or arsenic atom (As) and has two electrons configured about the central metal M. X preferably represents P from the viewpoints of availability and catalyst cost.

Y represents a divalent group selected from a substituted or unsubstituted methylene group (—$CH_2$—), substituted or unsubstituted imino group (—NH—), oxy group (—O—) or substituted or unsubstituted silylene group (—$SiH_2$—). Among these, a substituted or unsubstituted methylene group is preferable.

Examples of a substituted or unsubstituted methylene group include a methylene group, dimethyl methylene group, diethyl methylene group, monomethyl methylene group, monoethyl methylene group, diphenyl methylene group, monophenyl methylene group, mono(trimethylsilyl) methylene group, di(trimethylsilyl) methylene group, di(2-methoxyphenyl) methylene group, mono(2-methoxyphenyl) methylene group, di(3-methoxyphenyl) methylene group, mono(3-methoxyphenyl) methylene group, di(4-methoxyphenyl) methylene group, mono(4-methoxyphenyl) methylene group, di(2,6-dimethoxyphenyl) methylene group, mono(2,6-dimethoxyphenyl) methylene group, di(2,5-dimethoxyphenyl) methylene group, mono(2,5-dimethoxyphenyl) methylene group, di(2,4-dimethoxyphenyl) methylene group, mono(2,4-dimethoxyphenyl) methylene group, di(2,3-dimethoxyphenyl) methylene group, mono(2,3-dimethoxyphenyl) methylene group, di(3,5-dimethoxyphenyl) methylene group, mono(3,5-dimethoxyphenyl) methylene group, di(2,4,6-trimethoxyphenyl) methylene group, mono(2,4,6-trimethoxyphenyl) methylene group, di(2,4,6-trimethylphenyl) methylene group, mono(2,4,6-trimethylphenyl) methylene group, di(2-isopropylphenyl) methylene group, mono(2-isopropylphenyl) methylene group, di(2,6-diisopropylphenyl) methylene group, mono(2,6-diisopropylphenyl) methylene group, di(1-naphthyl) methylene group, mono(1-naphthyl) methylene group, di(2-naphthyl) methylene group, mono(2-naphthyl) methylene group, dimethoxymethylene group, diethoxymethylene group, dipropoxymethylene group, diisopropoxymethylene group, 1,2-ethanedioxymethylene group, 1,3-propanedioxymethylene group and carbonyl group. From the viewpoint of ease of catalyst synthesis, a methylene group, monomethyl methylene group, dimethyl methylene group, diphenyl methylene group or monomethyl methylene group is preferable, and a methylene group is particularly preferable.

Examples of a substituted or unsubstituted imino group include an imino group, N-methylimino group, N-ethylimino group, N-(n-propyl) imino group, N-isopropylimino group, N-(n-butyl) imino group, N-(sec-butyl) imino group, N-(t-butyl) imino group, N-benzylimino group, N-phenylimino group. N-trimethylsilylimino group, N-(2- methoxyphenyl) imino group, N-(3-methoxyphenyl) imino group, N-(4-methoxyphenyl) imino group, N-(2,6-dimethoxyphenyl) imino group, N-(2,5-dimethoxyphenyl) imino group, N-(2,4-dimethoxyphenyl) imino group, N-(2,3-dimethoxyphenyl) imino group, N-(3,5-dimethoxyphenyl) imino group, N-(2,4,6-trimethoxypheny) imino group, N-(2,4,6-trimethylphenyl) imino group, N-(1-naphthyl) imino group, N-(2-naphthyl) imino group and N-(t-butoxycarbonyl) imino group. From the viewpoint of ease of catalyst synthesis, an imino group, N-methylimino group, N-benzylimino group or N-(t-butoxycarbonyl) imino group is preferable, and an imino group or N-methylimino group is more preferable.

Examples of a substituted or unsubstituted silylene group include a silylene group, dimethylsilylene group, diethylsilylene group, monomethylsilylene group, monoethylsilylene group, diphenylsilylene group, monophenylsilylene group, mono(trimethylsilyl) silylene group, di(trimethylsilyl) silylene group, di(2-methoxyphenyl) silylene group, mono(2-methoxyphenyl) silylene group, di(3-methoxyphenyl) silylene group, mono(3-methoxyphenyl) silylene group, di(4-methoxyphenyl) silylene group, mono(4-methoxyphenyl) silylene group, di(2,6-dimethoxyphenyl) silylene group, mono(2,6-dimethoxyphenyl) silylene group, di(2,5-dimethoxyphenyl) silylene group, mono(2,5-dimethoxyphenyl) silylene group, di(2,4-dimethoxyphenyl) silylene group, mono(2,4-dimethoxyphenyl) silylene group, di(2,3-dimethoxyphenyl) silylene group, mono(2,3-dimethoxyphenyl) silylene group, di(3,5-dimethoxyphenyl) silylene group, mono(3,5-dimethoxyphenyl) silylene group, di(2,4,6-trimethoxyphenyl) silylene group, mono(2,4,6-trimethoxyphenyl) silylene group, di(2,4,6-trimethylphenyl) silylene group, mono(2,4,6-trimethylphenyl) silylene group, di(2-isopropylphenyl) silylene group, mono(2-isopropylphenyl) silylene group, di(2,6-diisopropylphenyl) silylene group, mono(2,6-diisopropylphenyl) silylene group, di(1-naphthyl) silylene group, mono(1-naphthyl) silylene group, di(2-naphthyl) silylene group, mono(2-napthyl) silylene group, dimethoxysilylene group, diethoxysilylene group, dipropoxysilylene group, diisopropoxysilylene group, 1,2-ethanedioxysilylene group and 1,3-propanedioxysilylene group. From the viewpoint of ease of catalyst synthesis, a silylene group, monomethylsilylene group, dimethylsilylene group, diphenylsilylene group or monomethylsilylene group is preferable, and a silylene group is particularly preferable.

$R^5$ represents a substituent selected from the group consisting of a hydrogen atom, halogen atom, hydrocarbon group having 1 to 30 carbon atoms, hydrocarbon group having 1 to 30 carbon atoms substituted with a halogen atom, hydrocarbon group having 2 to 30 carbon atoms substituted with an alkoxy group having 1 to 10 carbon atoms, hydrocarbon group having 7 to 30 carbon atoms substituted with an aryloxy group having 6 to 20 carbon atoms, hydrocarbon group having 3 to 30 carbon atoms substituted with an amido group having 2 to 10 carbon atoms, alkoxy group having 1 to 30 carbon atoms, aryloxy group having 6 to 30 carbon atoms and acyloxy group having 2 to 10 carbon atoms.

Specific preferable examples of halogen atoms represented by $R^5$ include fluorine, chlorine and bromine. Among these, chlorine is preferable.

A hydrocarbon group having 1 to 30 carbon atoms represented by $R^5$ is preferably a hydrocarbon group having 1 to 13 carbon atoms that is an alkyl group, cycloalkyl group, aryl group or aralkyl group.

Specific preferable examples thereof include a methyl group, ethyl group, 1-propyl group, 1-butyl group, 1-pentyl group, 1-hexyl group, 1-heptyl group, 1-octyl group, 1-nonyl group, 1-decyl group, t-butyl group, tricyclohexylmethyl group, 1,1-dimethyl-2-phenylethyl group, isopropyl group, 1,1-dimethylpropyl group, 1,1,2-trimethylpropyl group, 1,1-diethylpropyl group, 1-phenyl-2-propyl group, isobutyl group, 1,1-dimethylbutyl group, 2-pentyl group, 3-pentyl group, 2-hexyl group, 3-hexyl group, 2-ethylhexyl group, 2-heptyl group, 3-heptyl group, 4-heptyl group, 2-propylheptyl group, 2-octyl group, 3-nonyl group, cyclopropyl group, cyclobutyl group, cyclopentyl group, methylcyclopentyl group, cyclohexyl group, methylcyclohexyl group, cycloheptyl group, cyclooctyl group, cyclododecyl group, 1-adamantyl group, 2-adamantyl group, exonorbomyl group, endonorbornyl group, 2-bicyclo[2.2.2] octyl group, nopinyl group, decahydronaphthyl group, menthyl group, neomenthyl group, neopentyl group, 5-decyl group, phenyl group, naphthyl group, anthracenyl group, fluorenyl group, tolyl group, xylyl group, benzyl group and p-ethylphenyl group.

Among these, a methyl group or benzyl group is more preferable and a methyl group is particularly preferable.

A hydrocarbon group having 1 to 30 carbon atoms substituted with a halogen atom represented by $R^5$ is preferably a group in which the aforementioned hydrocarbon group having 1 to 30 carbon atoms is substituted with fluorine, chlorine or bromine, and specific preferable examples thereof include a trifluoromethyl group and pentafluorophenyl group.

A hydrocarbon group having 2 to 30 carbon atoms substituted with an alkoxy group having 1 to 10 carbon atoms represented by $R^5$ is preferably a group in which the aforementioned hydrocarbon group having 1 to 30 carbon atoms is substituted with a methoxy group, ethoxy group, isopropoxy group, 1-propoxy group, 1-butoxy group or t-butoxy group. This group is more preferably a hydrocarbon group having 2 to 6 carbon atoms substituted with a methoxy group or ethoxy group. Specific examples thereof include a 1-(methoxymethyl) ethyl group, 1-(ethoxymethyl) ethyl group, 1-(phenoxymethyl) ethyl group, 1-(methoxyethyl) ethyl group, 1-(ethoxyethyl) ethyl group, di(methoxymethy) methyl group, di(ethoxymethyl) methyl group and di(phenoxymethyl) methyl group. A 1-(methoxymethyl) ethyl group or 1-(ethoxymethyl) ethyl group is particularly preferable.

A hydrocarbon group having 7 to 30 carbon atoms substituted with an aryloxy group having 6 to 20 carbon atoms represented by $R^5$ is preferably a group in which the aforementioned hydrocarbon group having 1 to 30 carbon atoms is substituted with a phenoxy group, 4-methylphenoxy group, 4-methoxyphenoxy group, 2,6-dimethylphenoxy group or 2,6-di-t-butylphenoxy group. This group is more preferably a hydrocarbon group having 1 to 6 carbon atoms substituted with a phenoxy group or 2,6-dimethylphenoxy group, and particularly preferably a 1-(phenoxymethyl) ethyl group or 1-(2,6-dimethylphenoxymethyl) ethyl group.

A hydrocarbon group having 3 to 30 carbon atoms substituted with an amido group having 2 to 10 carbon atoms (R—(C=O)NH—, where, R represents an organic group) represented by $R^5$ is preferably a substituent in which the aforementioned hydrocarbon group having 1 to 30 carbon atoms is substituted with an acetoamido group, propionylamino group, butyrylamino group, isobutyrylamino group, valerylamino group, isovalerylamino group, pivaloylamino group or benzoylamino group. This group is more preferably a 2-acetoamidophenyl group, 2-propionylaminophenyl group, 2-valerylaminophenyl group or 2-benzoylphenyl group, and particularly preferably a 2-acetoamidophenyl group.

An alkoxy group having 1 to 30 carbon atoms represented by $R^5$ is preferably an alkoxy group having 1 to 6 carbon atoms, and specific preferable examples thereof include a methoxy group, ethoxy group, isopropoxy group, 1-propoxy group, 1-butoxy group and t-butoxy group. Among these, a methoxy group, ethoxy group or isopropoxy group is more preferable and a methoxy group is particularly preferable.

An aryloxy group having 6 to 30 carbon atoms represented by $R^5$ is preferably an aryloxy group having 6 to 12 carbon atoms, and specific preferable examples thereof include a phenoxy group, 4-methylphenoxy group, 4-methoxyphenoxy group, 2,6-dimethylphenoxy group and 2,6-di-t-butylphenoxy group. Among these, a phenoxy group or 2,6-dimethylphenoxy group is more preferable and a phenoxy group is particularly preferable.

An acyloxy group having 2 to 10 carbon atoms represented by $R^5$ is preferably an acyloxy group having 2 to 8 carbon atoms, and specific preferable examples thereof include an acetyloxy group, propionyloxy group, butyryloxy group, isobutyryloxy group, valeryloxy group, isovaleryloxy group, pivaloyloxy group and benzoyloxy group.

Among these, an acetyloxy group, propionyloxy group or benzoyloxy group is more preferable and an acetyloxy group or propionyloxy group is particularly preferable.

Among those preferable groups represented by $R^5$, more preferable examples include hydrocarbon groups having 1 to 20 carbon atoms, alkoxy groups having 1 to 30 carbon atoms, hydrocarbon groups having 3 to 30 carbon atoms substituted with an amido group having 2 to 10 carbon atoms and acyloxy groups having 2 to 10 carbon atoms, while particularly preferable specific examples include a methyl group, benzyl group, methoxy group, 2-acetoamidophenyl group and acetyloxy group.

$R^6$ and $R^7$ respectively and independently represent an alkoxy group, aryloxy group, silyl group, amino group or hydrocarbon group having 1 to 120 carbon atoms optionally substituted with one or more substituents selected from a halogen atom, alkoxy group and aryloxy group, at least one of $R^6$ and $R^7$ represents a tertiary alkyl group represented by general formula (2):

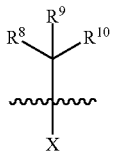

(2)

wherein, $R^8$, $R^9$ and $R^{10}$ respectively and independently represent a hydrocarbon group having 1 to 30 carbon atoms, $R^8$, $R^9$ and $R^{10}$ may respectively bond to form a ring structure, and in the formula, bonds between the carbon atom and X in general formula (C1) are also indicated.

Alkoxy groups represented by $R^6$ and $R^7$ are preferably those having 1 to 20 carbon atoms, and examples thereof include a methoxy group, ethoxy group, propoxy group and isopropoxy group.

Aryloxy groups represented by $R^6$ and $R^7$ are preferably those having 6 to 24 carbon atoms and an example thereof is a phenoxy group.

Examples of silyl groups represented by $R^6$ and $R^7$ include a trimethylsilyl group, and examples of amino groups include an amino group, methylamino group and dimethylamino group.

Specific examples of hydrocarbon groups having 1 to 120 carbon atoms optionally substituted with one or more groups selected from a halogen atom, alkoxy group and aryloxy group represented by $R^6$ and $R^7$ include a methyl group, ethyl group, n-propyl group, isopropyl group, n-butyl group, isobutyl group, sec-butyl group, t-butyl group, n-pentyl group, 2-pentyl group, 3-pentyl group, neopentyl group, n-hexyl group, 2-hexyl group, 3-hexyl group, 2-heptyl group, 3-heptyl group, 4-heptyl group, 2-methyl-4-heptyl group, 2,6-dimethyl-4-heptyl group, 3-methyl-4-heptyl group, cyclopropyl group, cyclobutyl group, cyclopentyl group, cyclohexyl group, cycloheptyl group, cyclooctyl group, 1-adamantyl group, trifluoromethyl group, benzyl group, 2'-methoxybenzyl group, 3'-methoxybenzyl group, 4'-methoxybenzyl group, 4'-trifluoromethylbenzyl group, phenyl group, 2-methylphenyl group, 3-methylphenyl group, 4-methylphenyl group, 2,6-dimethylphenyl group, 3,5-dimethylphenyl group, 2,4,6-trimethylphenyl group, 2-isopropylphenyl group, 3-isopropylphenyl group, 4-isopropylphenyl group, 2,6-diisopropylphenyl group, 3,5-diisopropylphenyl group, 2,4,6-triisopropylphenyl group, 2-t-butylphenyl group, 2-cyclohexylphenyl group, 2-methoxyphenyl group, 3-methoxyphenyl group, 4-methoxyphenyl group, 2,6-dimethoxyphenyl group, 35-dimethoxyphenyl group, 2,4,6-trimethoxyphenyl group, 4-fluorophenyl group, pentafluorophenyl group, 4-trifluoromethylphenyl group, 3,5-bis(trifluoromethyl) phenyl group, 1-naphthyl group, 2-naphthyl group, 2-furyl group, 2-biphenyl group, 2',6'-dimethoxy-2-biphenyl group, 2'-methyl-2-biphenyl group and 2',4',6'-triisopropyl-2-biphenyl group.

$R^6$ and $R^7$ may be the same or different. $R^6$ and $R^7$ may bond to form a ring structure.

At least one of $R^6$ and $R^7$ represents a tertiary alkyl group represented by general formula (2):

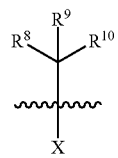

(2)

wherein, $R^8$, $R^9$ and $R^{10}$ respectively and independently represent a hydrocarbon group having 1 to 30 carbon atoms, $R^8$, $R^9$ and $R^{10}$ may respectively bond to form a ring structure, and in the formula, bonds between the carbon atom and X in general formula (C1) are also indicated.

$R^6$ and $R^7$ more preferably respectively and independently both represent a tertiary alkyl group represented by the aforementioned general formula (2), and are most preferably the same tertiary alkyl group, from the viewpoints of ease of synthesis, catalyst heat resistance and catalytic activity.

An alkyl group having 1 to 20 carbon atoms, a cycloalkyl group having 3 to 30 carbon atoms, an aryl group having 6 to 12 carbon atoms or an aralkyl group having 6 to 14 carbon atoms is preferable for a hydrocarbon group having 1 to 30 carbon atoms represented by $R^8$, $R^9$ and $R^{10}$. The cycloalkyl group may be a bridged cycloalkyl group. $R^8$, $R^9$ and $R^{10}$ respectively bond to form a ring structure, and $R^6$ and $R^7$ may be a tertiary bridged cycloalkyl group.

Examples of a tertiary alkyl group represented by general formula (2) include a t-butyl group, 3-ethyl-3-pentyl group, 4-propyl-4-heptyl group, 3-isopropyl-2,4-dimethyl-3-pentyl group, 5-(n-butyl)-5-nonyl group, 4-isobutyl-2,6-dimethyl-5-heptyl group, 4-(sec-butyl)-3,5-dimethy-5-heptyl group, 3-(t-butyl)-2,2,4,4-tetramethyl-3-pentyl group, tri(n-pentyl)-6-undecyl group, 5-(1-methylbutyl)-4,6-dimethyl-5-nonyl group, 5-(2-methylbutyl)-3,7-dimethyl-5-nonyl group, 5-(3-methylbutyl)-2,8-dimethyl-5-nonyl group, 4-1,1-dimethylpropyl)-3,3,5,5-tetramethyl-4-heptyl group, 4-(1,2-dimethylpropyl)-2,3,5,6-tetramethyl-4-heptyl group, 4-(2,2-dimethylpropyl)-2,2,6,6-tetramethyl-4-heptyl group, tri(cyclopropyl)methyl group, tri(cyclobutyl)methyl group, tri(cyclopentyl)methyl group, tri(cyclohexyl)methyl group, tri(cycloheptyl)methyl group, tri(cyclooctyl)methyl group, 2-methyl-2-butyl group, 2-methyl-2-pentyl group, 2,3-dimethyl-2-butyl group, 2-methyl-2-hexyl group, 2,3-dimethyl-2-pentyl group, 2,3,3-trimethyl-2-butyl group, 2-methyl-2-heptyl group, 2-methyl-2-octyl group, 3-methyl-3-pentyl group, 4-methyl-4-heptyl group, 2,3,4-trimethyl-3-pentyl group, 5-methyl-5-nonyl group, 6-methyl-6-undecyl group, triphenylmethyl group, 2-benzyl-2-propyl group and 1-adamantyl group, and from the viewpoints of ease of synthesis and molecular weight of the resulting polymer, a t-butyl group, 1-adamantyl group, 2-methyl-2-butyl group, 2-methyl-2-pentyl group, 2-benzyl-2-propyl group, 2,5-dimethyl-2-hexyl group, 3-methyl-3-pentyl group or 2,3,3-trimethyl-2-butyl group is preferable, and a t-butyl group, triphenylmethyl group or 1-adamantyl group is more preferable.

The metal complex of the catalyst represented by general formula (C1) can be synthesized using the same method as that described in the known literature (such as J. Am. Chem. Soc., 2007, 129, 8948). Namely, a metal complex is synthesized by reacting a zero-valent or divalent M source and a ligand in general formula (C1).

Examples of palladium sources used as a zero-valent M source include tris(dibenzylideneacetone) dipalladium, and examples of nickel sources include tetracarbonyl nickel (O):Ni (CO)$_4$ and bis(1,5-cyclooctadiene) nickel.

Examples of palladium sources used as a divalent M source include (1,5-cyclooctadiene) methylpalladium chloride, palladium chloride, palladium acetate, bis(acetonitrile) dichloropalladium: PdCl$_2$(CH$_3$CN)$_2$, bis(benzonitrile) dichloropalladium: PdCl$_2$(PhCN)$_2$, (N,N,N'—N'-tetramethylethylenediamine) dichloropalladium (II): PdCl$_2$(TMEDA), (N,N,N',N'-tetramethylethylenediamine) dimethylpalladium (II): PdMe$_2$(TMEDA), bis(acetylacetonato) palladium (II): Pd(acac)$_2$ (acac=acetylacetonato) and palladium (II) trifluoromethanesulfonate: Pd(OSO$_2$CF$_3$)$_2$, and examples of nickel sources include allylnickel chloride, allylnickel bromide, nickel chloride, nickel acetate, bis(acetylacetonato) nickel (II): Ni(acac)$_2$, (1,2-dimethoxyethane) dichloronickel (II): NiCl$_2$(DME) and nickel (II) trifluoromethanesulfonate: Ni(OSO$_2$CF$_3$).

The metal complex represented by general formula (C1) can be used after having isolating the complex or can be used for polymerization in situ after having contacting with a metal source containing M and a ligand precursor in a reaction system without isolating the complex. In the case R$^5$ in general formula (C1) is a hydrogen atom in particular, a metal source containing a zero-valent M is preferably reacted with a ligand precursor followed by using for polymerization in situ without isolating the complex.

In the case of general formula (C1), the ligand precursor in this case is represented by:

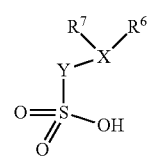

(C1-1)

wherein, symbols in the formula have the same meanings as previously described.

The ratio of the ligand precursor (C1-1) (C1 ligand) to the M source (M) in general formula (C1) (C1 ligand/M) is preferably selected to be within the range of 0.5-2.0 and more preferably within the range of 1.0-1.5.

In the case of isolating the metal complex of general formula (C1), the metal complex can also be used after stabilizing by preliminarily coordinating an electron donating ligand (L). In this case, q becomes ½, 1 or 2. A value of ½ for q means that a single divalent electron donating ligand is coordinated with two metal complexes. The value of q is preferably ½ or 1 from the viewpoint of stabilizing the metal complex catalyst. A value of 0 for q means that there is no ligand present.

An electron donating ligand (L) refers to a compound that has an electron donating group and can stabilize a metal complex by coordinating with a metal atom M.

An example of an electron donating ligand (L) that has a sulfur atom is dimethylsulfoxide (DMSO). Examples of those having a nitrogen atom include trialkylamines of alkyl groups having 1 to 10 carbon atoms, dialkylamines of alkyl groups having 1 to 10 carbon atoms, pyridine, 2,6-dimethylpyridine (also known as 2,6-lutidine), aniline, 2,6-dimethylaniline, 2,6-diisopropylaniline, N,N,N',N'-tetramethylethylenediamine (TMEDA), 4-(N,N-dimethylamino) pyridine (DMAP), acetonitrile, benzonitrile, quinoline and 2-methylquinoline. Examples of those having an oxygen atom include diethyl ether, tetrahydrofuran and 1,2-dimethoxyethane. From the viewpoint of stability of the metal complex and catalytic activity, dimethylsulfoxide (DMSO), pyridine, 2,6-dimethylpyridine (also known as 2,6-lutidine) and N,N, N',N'-tetramethylethylenediamine (TMEDA) are preferable, and dimethylsulfoxide (DMSO) and 2,6-dimethylpyridine (also known as 2,6-lutidine) are more preferable.

The metal complex represented by general formula (C1) can also be used in polymerization by loading on a support. There are no particular limitations on the support in this case, and examples of supports that can be used include inorganic supports such as silica gel or alumina, and organic supports such as polystyrene, polyethylene or polypropylene. Examples of methods for loading the metal complex include a physical adsorption method comprising impregnating a support with a solution of the metal complex followed by drying, and a method comprising loading the metal complex by chemically bonding the metal complex and the support.

[Monomer]

In the polymer production method of the present invention, not only can ethylene be subjected to homopolymerizaton, but ethylene can also be copolymerized with an olefin having a polar group. The olefin having a polar group serving as a second monomer used for copolymerization in the present invention is represented by general formula (1).

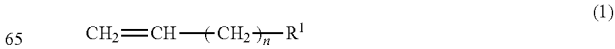

(1)

In the above formula, $R^1$ represents a substituent selected from the group consisting of a hydroxy group, alkoxy group having 1 to 10 carbon atoms, aryloxy group having 6 to 20 carbon atoms, acyl group having 2 to 10 carbon atoms, ester group having 2 to 10 carbon atoms (oxycarbonyl group: R—O—(C=O)—, where R represents an organic group), acyloxy group having 2 to 10 carbon atoms, amino group, substituted amino group having 1 to 12 carbon atoms, substituted amido group having 2 to 12 carbon atoms, substituted pyridyl group having 5 to 10 carbon atoms, substituted pyrrolidyl group having 4 to 10 carbon atoms, substituted piperidyl group having 5 to 10 carbon atoms, substituted hydrofuryl group having 4 to 10 carbon atoms, substituted imidazolyl group having 4 to 10 carbon atoms, mercapto group, alkylthio group having 1 to 10 carbon atoms, arylthio group having 6 to 10 carbon atoms, epoxy group and halogen atom, n represents 0 or an arbitrary integer selected from 1 to 6.

An alkoxy group having 1 to 10 carbon atoms represented by $R^1$ is preferably an alkoxy group having 1 to 4 carbon atoms, and specific preferable examples thereof include a methoxy group, ethoxy group, isopropoxy group, 1-propoxy group, 1-butoxy group and t-butoxy group.

Among these, a methoxy group, ethoxy group or isopropoxy group is a more preferable substituent, and a methoxy group is particularly preferable.

An aryloxy group having 6 to 20 carbon atoms represented by $R^1$ is preferably an aryloxy group having 6 to 12 carbon atoms, and specific preferable examples thereof include a phenoxy group, 4-methylphenoxy group, 4-methoxyphenoxy group, 2,6-dimethylphenoxy group, 3,5-di-t-butylphenoxy group and 2,6-di-t-butylphenoxy group.

Among these, a phenoxy group, 3,5-di-t-butylphenoxy group or 2,6-dimethylphenoxy group is a more preferable substituent, and a phenoxy group or 3,5-di-t-butylphenoxy group is particularly preferable.

An acyl group having 2 to 10 carbon atoms represented by $R^1$ is preferably an acyl group having 2 to 8 carbon atoms, and specific preferable examples thereof include an acetyl group, propionyl group, butyryl group, isobutyryl group, valeryl group, isovaleryl group, pivaloyl group and benzoyl group.

Among these, an acetyl group, pivaloyl group or benzoyl group is a more preferable substituent, and a benzoyl group is particularly preferable.

An ester group (oxycarbonyl group) having 2 to 10 carbon atoms represented by $R^1$ is preferably an ester group having 2 to 8 carbon atoms, and specific preferable examples thereof include a methoxycarbonyl group, ethoxycarbonyl group, n-propoxycarbonyl group, isopropoxycarbonyl group, n-butoxycarbonyl group, t-buoxycarbonyl group, (4-hydroxybutoxy) carbonyl group, (4-glycidylbutoxy) carbonyl group and phenoxycarbonyl group.

Among these, examples of more preferable substituents include a methoxycarbonyl group, ethoxycarbonyl group and (4-hydroxybutoxy) carbonyl group, and a methoxycarbonyl group is particularly preferable.

An acyloxy group having 2 to 10 carbon atoms represented by $R^1$ is preferably an acyloxy group having 2 to 8 carbon atoms, and specific preferable examples thereof include an acetyloxy group, propionyloxy group, butyryloxy group, isobutyryloxy group, valeryloxy group, isovaleryloxy group, pivaloyloxy group and benzoyloxy group.

Among these, an acetyloxy group, propionyloxy group or benzoyloxy group is a more preferable substituent, and an acetyloxy group or propionyloxy group is particularly preferable.

Specific preferable examples of a substituted amino group having 1 to 12 carbon atoms represented by $R^1$ include a monomethylamino group, dimethylamino group, monoethylamino group, diethylamino group, monoisopropylamino group, diisopropylamino group, monophenylamino group, diphenylamino group, bis(trimethylsilyl)amino group and morpholinyl group.

Among these, a dimethylamino group or diphenylamino group is a more preferable substituent.

Specific preferable examples of a substituted amido group having 1 to 12 carbon atoms (R—(C=O)NH—, where, R represents an organic group) represented by $R^1$ include an acetoamido group, propionylamino group, butyrylamino group, isobutyrylamino group, valerylamino group, isovalerylamino group, pivaloylamino group and benzoylamino group.

Among these, an acetoamido group, propionylamino group or benzoylamino group is a more preferable substituent, and an acetoamido group is particularly preferable.

Specific preferable examples of a substituted pyridyl group having 5 to 10 carbon atoms represented by $R^1$ include a 2-pyridyl group, 3-pyridyl group, 2-(3-methyl)pyridyl group, 2-(4-methyl)pyridyl group, 3-(2-methyl)pyridyl group, 3-(4-methyl)pyridyl group, 2-(4-chloromethyl) pyridyl group and 3-(4-chloromethyl)pyridyl group.

Among these, a 2-pyridyl group, 3-pyridyl group or 2-(4-methyl)pyridyl group is a more preferable substituent, and a 2-pyridyl group is particularly preferable.

Specific preferable examples of a substituted pyrrolidyl group having 4 to 10 carbon atoms represented by $R^1$ include a 2-pyrrolidyl group, 3-pyrrolidyl group, 2-(1-methyl)pyrrolidyl group, 2-(1-butyl)pyrrolidyl group, 2-(1-cyclopentenyl)pyrrolidyl group, 2-(4-methoxycarbonyl)pyrrolidyl group, 2-(5-methoxycarbonyl)pyrrolidyl group and 2-(6-methoxycarbonyl)pyrrolidyl group.

Among these, a 2-pyrrolidyl group, 3-pyrrolidyl group, 2-(1-methyl)pyrrolidyl group or 2-(6-methoxycarbony)pyrrolidyl group is a more preferable substituent, and a 2-pyrrolidyl group is particularly preferable.

Specific preferable examples of a substituted piperidyl group having 5 to 10 carbon atoms represented by $R^1$ include a 2-piperidyl group, 3-piperidyl group, 2-(1,2,3,6-tetrahydro)piperidyl group, 2-(1-methyl)piperidyl group, 2-(1-ethyl)piperidyl group, 2-(4-methyl)piperidyl group, 2-(5-methyl)piperidyl group and 2-(6-methyl)piperidyl group.

Among these, a 2-piperidyl group, 3-piperidyl group, 2-(1,2,3,6-tetrahydro)piperidyl group or 2-(6-methyl)piperidyl group is a more preferable substituent, and a 2-piperidyl group or 2-(1,2,3,6-tetrahydro)piperidyl group is particularly preferable.

Specific preferable examples of a substituted hydrofuryl group having 4 to 10 carbon atoms represented by $R^1$ include a 2-tetrahydrofuryl group, 3-tetrahydrofuryl group, 2-(5-methyl)tetrahydrofuryl group, 2-(5-isopropyl)tetrahydrofuryl group, 2-(5-ethyl)tetrahydrofuryl group, 2-(5-methoxy) tetrahydrofuryl group, 2-(5-acetyl)tetrahydrofuryl group and 2-(4,5-benzo)tetrahydrofuryl group.

Among these, a 2-tetrahydrofuryl group, 3-tetrahydrofuryl group, 2-(5-methyl)tetrahydrofuryl group, 2-(5-isopropyl)tetrahydrofuryl group or 2-(4,5-benzo)tetrahydrofuryl group is a more preferable substituent, and a 2-tetrahydrofuryl group, 2-(5-methyl)tetrahydrofuryl group or 2-(5-isopropyl)tetrahydrofuryl group is particularly preferable.

Specific preferable examples of a substituted imidazolyl group having 4 to 10 carbon atoms represented by $R^1$ include a 2-imidazolyl group, 2-(1-methyl)imidazolyl group, 2-(1- benzyl)imidazolyl group, 2-(1-acetyl)imidazolyl group, 2-(4,5-benzo)imidazolyl group and 2-(1-methyl-4,5-benzo) imidazolyl group.

Among these, a 2-imidazolyl group, 2-(1-methyl)imidazolyl group or 2-(4,5-benzo)imidazolyl group is a more preferable substituent, and a 2-(1-methyl)imidazolyl group or 2-(4,5-benzo)imidazolyl group is particularly preferable.

Specific preferable examples of an alkylthio group having 1 to 10 carbon atoms represented by $R^1$ include a methylthio group, ethylthio group, propylthio group and t-butylthio group, and a specific preferable example of an arylthio group having 6 to 10 carbon atoms represented by $R^1$ is a phenylthio group.

Among these, a methylthio group, t-butylthio group or phenylthio group is a more preferable substituent, and a methylthio group or phenylthio group is particularly preferable.

Specific preferable examples of a halogen atom represented by $R^1$ include fluorine, chlorine and bromine. Among these, chlorine is a more preferable substituent.

Among these preferable groups represented by R, alkoxy groups having 1 to 10 carbon atoms, ester groups having 2 to 10 carbon atoms and acyloxy groups having 2 to 10 carbon atoms are more preferable, and particularly preferable examples of polar comonomers represented by general formula (1) include methyl acrylate, ethyl acrylate, allyl acetate and allyl methyl ether.

In the (co)polymer production method of the present invention, a combination of two or more types of olefins having a polar group as represented by general formula (1) may be polymerized with ethylene.

In the (co)polymer production method of the present invention, in addition to olefins having a polar group represented by general formula (1), another monomer (third monomer) may be used with ethylene. Examples of a third monomer include α-olefins such as propylene, 1-butene, 1-pentene, 1-hexene, 4-methyl-1-pentene, 1-heptene, 1-octene, 1-nonene, 1-decene or styrene. Among these, propylene, 1-butene or 1-hexene is preferable. Two or more types thereof may be polymerized in combination. However, when a α-olefin is copolymerized as a third monomer, the ratio of the α-olefin to the total of α-olefin and ethylene contained in the resulting polymer is less than 40 mol %.

[Polymerization Method]

There are no particular limitations on the method used to polymerize ethylene alone or polymerize ethylene and a monomer represented by general formula (1) using the metal complex of the present invention as a catalyst, and polymerization is possible with a commonly used method. Namely, although a process using solution polymerization, suspension polymerization or gas phase polymerization, for example, can be used, solution polymerization and suspension polymerization are particularly preferable. The type of polymerization can be batch polymerization or continuous polymerization. Polymerization can be carried out in a single stage or multiple stages.

The metal complex catalyst represented by general formula (C1) may be used in a polymerization reaction by mixing two or more types thereof. Using a mixture of metal complex catalysts makes it possible to control polymer molecular weight of the polymer, molecular weight distribution, and the content of the monomer unit derived from the monomer of general formula (1), thereby allowing the obtaining of a polymer suitable for the desired application. The molar ratio between the total amount of metal complex catalyst and the total amount of monomer as the ratio of monomer/metal complex is within the range of 1-10,000,000, preferably within the range of 10-1,000,000, and more preferably within the range of 100-100,000.

Although there are no particular limitations thereon, polymerization temperature is normally within the range of −30-400° C., preferably within the range of 0-200° C., and more preferably within the range of 30-180° C. Polymerization can be carried out at a high temperature at which activity becomes high since the metal complex of the present embodiment has heat resistance. In that case, the polymerization temperature is preferably 100-180° C. and more preferably 120-170° C.

Polymerization pressure, for which ethylene accounts for the majority of internal pressure, is within the range of normal pressure to 100 MPa, preferably within the range of normal pressure to 20 MPa, and more preferably within the range of normal pressure to 10 MPa.

Polymerization time can be suitably adjusted according to the type of process and the polymerization activity of the catalyst, etc., and polymerization can be carried out over a short reaction time from several tens of seconds to several minutes or a long reaction time of several thousands of hours.

In order to prevent a decrease in catalytic activity, the atmosphere in the polymerization system is preferably filled with an inert gas such as nitrogen gas or argon gas so as not to allow contamination by air, oxygen or moisture other than the monomer. In the case of solution polymerization, an inert solvent other than the monomer can be used. There are no particular limitations on the inert solvent, and examples thereof include aliphatic hydrocarbons such as isobutane, pentane, hexane, heptane or cyclohexane, aromatic hydrocarbons such as benzene, toluene or xylene, halogenated aliphatic hydrocarbons such as chloroform, methylene chloride, carbon tetrachloride, dichloroethane or tetrachloroethane, halogenated aromatic hydrocarbons such as chlorobenzene, dichlorobenzene or trichlorobenzene, aliphatic esters such as methyl acetate or ethyl acetate, and aromatic esters such as methyl benzoate or ethyl benzoate.

EXAMPLES

Although the following provides a more detailed explanation of the present invention by listing examples and comparative examples thereof, the present invention is not limited to the following examples.

[Analysis of Polymer Structure]

The number average molecular weights and weight average molecular weights of (co)polymers obtained in the examples were calculated by size exclusion chromatography (solvent: 1,2-dichlorobenzene, temperature: 145° C.) using polystyrene as a molecular weight standard using the HLC-8121GPC/HT high-temperature GPC system manufactured by Tosoh Corp. equipped with AT-806MS columns (two columns in series) manufactured by Showa Denko KK.

The content of the monomer unit derived from an olefin having a polar group represented by general formula (1) was determined by $^1$H-NMR at 120° C. using 1,1,2,2-tetrachloroethane-d2 for the solvent and using the JNM-ECS400 NMR system manufactured by JEOL Ltd.

[Synthesis of Metal Complex 1 and Metal Complex 2]

Metal Complex 1 was synthesized in accordance with the reaction scheme indicated below.

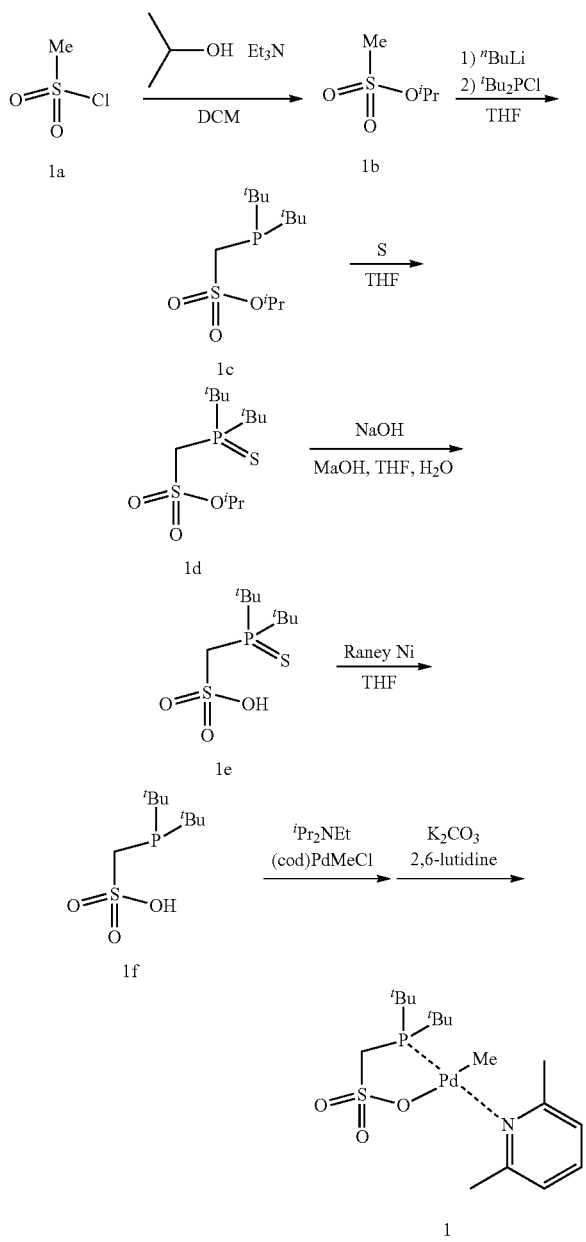

(a) Synthesis of Isopropyl Methanesulfonate (Compound 1b)

A dichloromethane solution (50 mL) of 2-propanol (10.5 g, 174.6 mmol, 1.0 eq.) and triethylamine (44.2 g, 436.5 mmol, 2.5 eq.) was slowly added at 0° C. to a dichloromethane solution (50 mL) of methanesulfonate chloride (Compound 1a: 20.0 g, 174.6 mmol) followed by stirring for 16 hours at 25° C. After filtering the reaction solution and concentrating the recovered filtrate, the filtrate was again dissolved in dichloromethane (50 mL) and washed with 1 M hydrochloric acid (20 mL), saturated aqueous sodium bicarbonate (20 mL) and saturated salt solution (20 mL). After dehydrating with anhydrous sodium sulfate and filtering, the target compound (Compound 1b) was obtained as a yellow oil by concentration. The yield was 20.2 g (yield percentage: 84%).

$^1$H-NMR (400 MHz, CDCl$_3$): δ 4.91 (m, 1H), 3.04 (s, 3H), 1.39 (s, 3H), 1.38 (s, 3H)

(b) Synthesis of Isopropyl Di-t-butyl Phosphanyl Methanesulfonate (Compound 1c)

n-Butyl lithium (2.5 M hexane solution, 45.6 mmol, 1.1 eq.) was added to a tetrahydrofuran solution (100 mL) of isopropyl methanesulfonate (Compound 1b: 6.0 g, 43.4 mmol) at 0° C. followed by stirring for 1 hour at 0° C. After cooling the reaction vessel to −78° C., di-t-butyl phosphine chloride (7.8 g, 43.4 mmol, 1.0 eq.) was added at −78° C. followed by stirring for 16 hours at room temperature. After distilling off the solvent under reduced pressure, the residue was purified by silica gel chromatography (pentane/ethyl acetate=20/1) and washed with pentane (5 mL×2 times) to obtain the target compound (Compound 1c) as a white powder. Yield: 3.6 g (yield percentage: 29%).

$^1$H-NMR (400 MHz, CDCl$_3$): 5.00 (m, 1H), 3.26 (br, 2H), 1.41 (d, J=6.4 Hz, 6H), 1.19 (d, J=12.0 Hz, 18H)

$^{31}$P-NMR (162 MHz, CDCl$_3$): δ 18.4

(c) Synthesis of Isopropyl Di-t-Butyl(Thio) Phosphinomethanesulfonate (Compound 1d)

Sulfur (2.5 M hexane solution, 2.03 g, 63.39 mmol, 5 eq.) was added to a tetrahydrofuran (THF) solution (40 mL) of isopropyl di-t-butyl phosphanyl methanesulfonate (Compound 1c: 3.58 g, 12.68 mmol) at −78° C. followed by stirring for 16 hours at 25° C. and further stirring for 2 hours at 60° C. The reaction solution was filtered and the filtration residue was washed with ethyl acetate (20 mL) followed by recovering all of the solution and distilling off the solvent under reduced pressure. Pentane (10 mL) was added to the residue followed by filtration and vacuum drying to obtain the target compound (Compound 1d) as a white powder. Yield: 3.5 g (yield percentage: 88%).

$^1$H-NMR (400 MHz, CDCl$_3$): δ 5.16 (m, 1H), 3.80 (br, 2H), 1.46 (d, J=6.4 Hz, 6H), 1.43 (d, J=12.0 Hz, 18H)

$^{31}$P-NMR (162 MHz, CDCl$_3$): δ 74.5

(d) Synthesis of Di-t-Butyl (Thio) Phosphinomethanesulfonate (Compound 1e)

Sodium hydroxide (2.66 g, 66.47 mmol, 4 eq.) was added to a mixture of isopropyl di-t-butyl (thio) phosphinomethanesulfonate (Compound 1d: 5.5 g, 16.62 mmol) in methanol (40 mL), THF (20 mL) and water (5 mL) followed by stirring for 16 hours at 66° C. After distilling of the solvent from this reaction solution and concentrating, the residue was washed with ethyl acetate (20 mL) and the resulting white powder was suspended in a mixed solution of ethanol (100 mL) and dichloromethane (50 mL) followed by neutralizing to pH=5 with HCl/ethyl acetate. After filtering the neutralized solution, concentrating the filtrate followed by dissolving in dichloromethane, and removing insoluble matter by filtration, the solvent was distilled off under reduced pressure to obtain the target compound (Compound 1e) as a pale yellow powder. Yield: 4.2 g (yield percentage: 93%).

$^1$H-NMR (400 MHz, CDCl$_3$): δ 6.28 (br, 1H), 3.75 (d, J=6.4 Hz, 2H), 1.41 (d, J=16.8 Hz, 18H)

$^{31}$P-NMR (162 MHz, CDCl$_3$): δ 72.2

(e) Synthesis of Di-t-Butyl Phosphanyl Methanesulfonate (Compound 1f)

A THF solution (40 mL) of di-t-butyl (thio) phosphinomethanesulfonate (Compound 1e: 2.1 g, 7.71 mmol, 1 eq.) was slowly added to a THF solution (100 mL) of Raney®-Ni (4.5 g, 52.5 mmol, 6.8 eq.) using a syringe followed by stirring for 16 hours at room temperature. Dichloromethane (80 mL) was added to this reaction solution followed by filtering and distilling off the solvent under reduced pressure. This reactant was suspended in dichloromethane (200 mL), and after removing insoluble matter by filtration, the solvent was distilled off under reduced pressure to obtain the target compound (Compound 1f) as a pink powder. Yield: 0.8 g (yield percentage: 44%).

$^1$H-NMR (400 MHz, CDCl$_3$): δ 4.88 (br, 1H), 3.06 (d, J=3.2 Hz, 2H), 1.17 (d, J=11.2 Hz, 18H)

$^{31}$P-NMR (162 MHz, CDCl$_3$): δ 19.1

(f) Synthesis of Metal Complex 1

(cod)PdMeCl (cod=1,5-cyclooctadiene, 1.05 g, 3.96 mmol) was added to a methylene chloride solution (30 mL) of di-t-butyl phosphanyl methanesulfonate (Compound 1f: 0.95 g, 3.96 mmol) and N,N-diisopropylethylamine (3.5 mL, 19.8 mmol) under a nitrogen atmosphere followed by stirring for 1 hour at room temperature. After concentrating the solution, the residue was dissolved in dichloromethane (15 mL), and this solution was added to a dichloromethane suspension (10 mL) of potassium carbonate (5.47 g, 39.6 mmol) and 2,6-lutidine (4.61 mL, 39.8 mmol) followed by stirring for 1 hour at room temperature. After filtering this reaction solution with celite (dry diatomaceous earth) and florisil (magnesium silicate), the filtrate was concentrated and dried under vacuum. The residue was washed with hexane (15 mL×3 times) to obtain Metal Complex 1. The yield was 1.2 g (yield percentage: 63%).

$^1$H-NMR (400 MHz, CDCl$_3$): δ 7.57 (t, J=7.8 Hz, 1H), 7.11 (d, J=7.8 Hz, 2H), 3.44 (d, J=8.2 Hz, 2H), 3.06 (s, 6H), 1.49 (d, J=14.6 Hz, 18H), 0.54 (d, J=1.9 Hz, 3H)

$^{31}$P-NMR (162 MHz, CDCl$_3$): δ 46.5

(g) Synthesis of Metal Complex 2

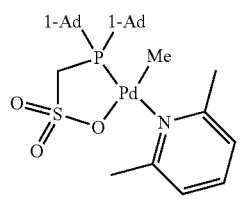

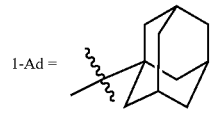

Metal Complex 2 was synthesized using the same method as in the synthesis of Metal Complex 1 indicated in the aforementioned sections (a) to (f) by substituting di-t-butyl phosphine chloride, which is a raw material of Metal Complex 1, with di(1-adamantyl) phosphine chloride.

$^1$H-NMR (400 MHz, CDCl$_3$): δ 7.56 (t, J=7.4 Hz, 1H), 7.11 (d, J=7.4 Hz, 2H), 3.46 (d, J=7.6 Hz, 2H), 3.09 (s, 6H), 2.25 (br.s, 12H), 2.09 (br.s, 6H), 1.78 (br.s, 12H), 0.56 (d, J=1.9 Hz, 3H)

$^{31}$P-NMR (162 MHz, CDCl$_3$): δ 40.0

[Synthesis of Metal Complex 3 to Metal Complex 9]

(h) Synthesis of Metal Complex 3

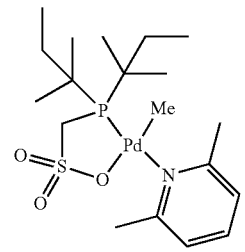

Metal Complex 3 was synthesized using the same method as in the synthesis of Metal Complex 1 indicated in the aforementioned sections (a) to (f) with the exception of substituting di-t-butyl phosphine chloride, which is a raw material of Metal Complex 1, with di-(2-methyl-2-butyl) phosphine chloride (equal number of moles).

$^1$H-NMR (400 MHz, CDCl$_3$): δ 7.58 (t, J=7.6 Hz, 1H), 7.11 (d, J=8.0 Hz, 2H), 3.47 (d, J=8.0 Hz, 2H), 3.07 (s, 6H), 1.98 (quint, J=7.0 Hz, 4H), 1.44 (dd, J=15.4, 9.8 Hz, 12H), 1.00 (t, J=7.2 Hz, 6H), 0.53 (d, J=1.6 Hz, 3H)

$^{31}$P-NMR (162 MHz, CDCl$_3$): δ 51.6

(i) Synthesis of Metal Complex 4

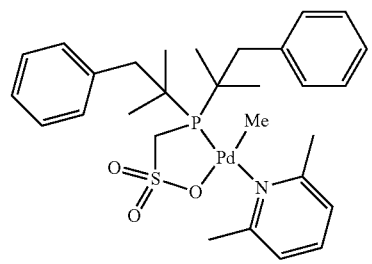

Metal Complex 4 was synthesized using the same method as in the synthesis of Metal Complex 1 indicated in the aforementioned sections (a) to (f) with the exception of substituting di-t-butyl phosphine chloride, which is a raw material of Metal Complex 1, with di-(2-benzyl-2-propyl) phosphine chloride (equal number of moles).

$^1$H-NMR (400 MHz, CDCl$_3$): δ 7.61 (t, J=7.6 Hz, 1H), 7.36-7.27 (m, 6H), 7.20 (d, J=8.0 Hz, 2H), 7.14 (d, J=8.0 Hz, 2H), 3.70 (d, J=8.4 Hz, 2H), 3.34 (d, J=6.4 Hz, 4H), 3.12 (s, 6H), 1.44 (t, J=14.6 Hz, 12H), 0.71 (d, J=1.2 Hz, 3H)

$^{31}$P-NMR (162 MHz, CDCl$_3$): δ 52.7

(j) Synthesis of Metal Complex 5

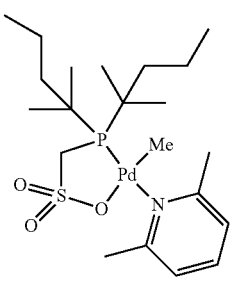

Metal Complex 5 was synthesized using the same method as in the synthesis of Metal Complex 1 indicated in the aforementioned sections (a) to (f) with the exception of substituting di-t-butyl phosphine chloride, which is a raw material of Metal Complex 1, with di-(2-methyl-2-pentyl) phosphine chloride (equal number of moles).

$^1$H-NMR (400 MHz, CDCl$_3$): δ 7.57 (t, J=7.6 Hz, 1H), 7.11 (d, J=8.0 Hz, 2H), 3.48 (d, J=7.6 Hz, 2H), 3.07 (s, 6H), 1.95-1.85 (m, 4H), 1.55-1.45 (m, 16H), 0.98 (t, J=7.2 Hz, 6H), 0.53 (d, J=2.0 Hz, 3H)

$^{31}$P-NMR (162 MHz, CDCl$_3$): δ 50.9

(k) Synthesis of Metal Complex 6

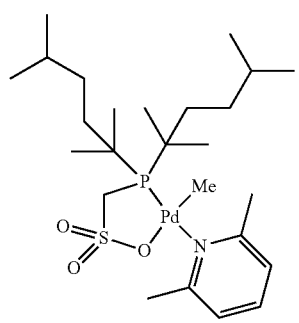

Metal Complex 6 was synthesized using the same method as in the synthesis of Metal Complex 1 indicated in the aforementioned sections (a) to (f) with the exception of substituting di-t-butyl phosphine chloride, which is a raw material of Metal Complex 1, with di-(2,5-dimethyl-2-hexyl) phosphine chloride (equal number of moles).

$^1$H-NMR (400 MHz, CDCl$_3$): δ 7.57 (t, J=7.8 Hz, 1H), 7.11 (d, J=8.0 Hz, 2H), 3.48 (d, J=8.4 Hz, 2H), 3.06 (s, 6H), 1.95-1.85 (m, 4H), 1.6-1.5 (m, 2H), 1.45 (dd, J=7.6 Hz, 12H), 1.34-1.20 (m, 4H), 0.93 (d, J=7.2 Hz, 12H), 0.53 (d, J=2.0 Hz, 3H)

$^{31}$P-NMR (162 MHz, CDCl$_3$): δ 52.3

(l) Synthesis of Metal Complex 7

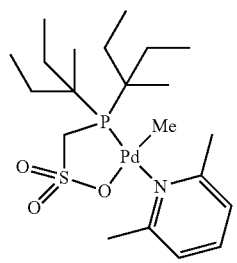

Metal Complex 7 was synthesized in accordance with the reaction scheme indicated below.

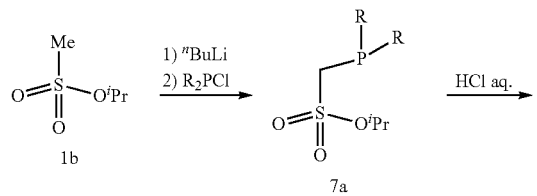

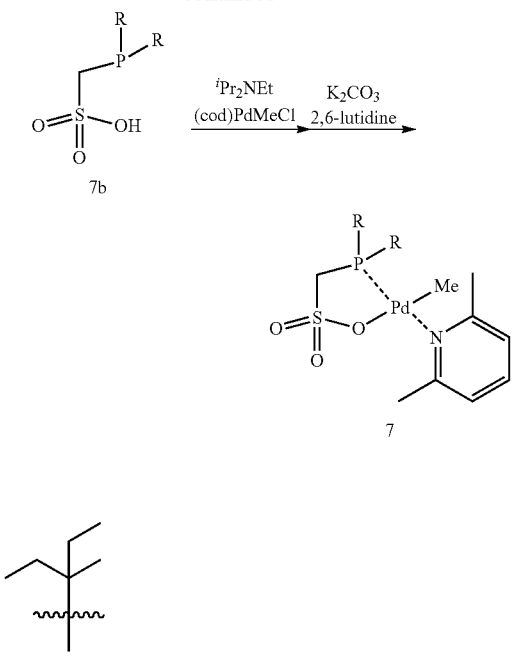

Compound 7a was synthesized using the same method as in the synthesis of Compound 1c indicated in the aforementioned section (b) with the exception of substituting di-t-butyl phosphine chloride, which is a raw material of Compound 1c, with diethyl methylphosphine chloride (equal number of moles).

Continuing, Compound 7b was synthesized by the hydrolysis reaction of Compound 7a. Namely, a mixture of 36 wt % hydrochloric acid (21.4 g, hydrogen chloride: 211 mmol, 10 eq.) and distilled water (10.7 mL) was added to a 200 mL recovery flask containing Compound 7a (6.2 g, 21.1 mmol) and dehydrated tetrahydrofuran (110 mL) in a nitrogen atmosphere followed by stirring for 8 hours while heating to 60° C. After cooling to room temperature, the tetrahydrofuran was removed with a rotary evaporator and dichloromethane and distilled water were added to the remaining residue followed by separation extraction with dichloromethane. After washing the extracted organic layer with saturated aqueous sodium chloride solution and drying with magnesium sulfate, the solvent was distilled off with a rotary evaporator to obtain 5.52 g of an oily substance. The oily substance was extracted three times with hexane to obtain 0.55 g of di-(3-methyl-3-pentyl) phosphanyl methanesulfonate (Compound 7b).

Metal Complex 7 was synthesized using the same method as in the synthesis of Metal Complex 1 indicated in the aforementioned section (f) with the exception of substituting di-t-butyl phosphanyl methanesulfonate (Compound 1f), which is a raw material of Metal Complex 1, with di-(3-methyl-3-pentyl) phosphanyl methanesulfonate (Compound 7b, equal number of moles).

$^1$H-NMR (400 MHz, CDCl$_3$): δ 7.57 (t, J=7.7 Hz, 1H), 7.11 (d, J=7.7 Hz, 2H), 3.54 (d, J=8.0 Hz, 2H), 3.06 (s, 6H), 2.08 (m, 4H), 1.95 (m, 4H), 1.44 (d, J=16.0 Hz, 6H), 1.10 (t, J=7.4 Hz, 12H), 0.54 (d, J=1.6 Hz, 3H)

$^{31}$P-NMR (162 MHz, CDCl$_3$): δ 50.9

(m) Synthesis of Metal Complex 8

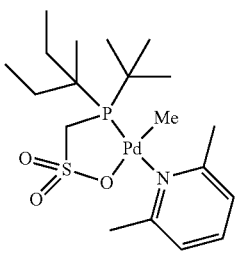

8

Metal Complex 8 was synthesized using the same method as in the synthesis of Metal Complex 1 indicated in the aforementioned sections (a) to (f) with the exception of substituting di-t-butyl phosphine chloride, which is a raw material of Metal Complex 1, with t-butyl (3-methyl-3-pentyl) phosphine chloride (equal number of moles).

$^1$H-NMR (400 MHz, CDCl$_3$): δ 7.57 (t, J=7.9 Hz, 1H), 7.11 (d. J=7.9 Hz, 2H), 3.51 (dd, J=14.8, 8.4 Hz, 1H), 3.42 (dd, J=14.8, 8.4 Hz, 1H), 3.06 (d, J=20.0 Hz, 6H), 2.02 (m, 2H), 1.89 (m, 2H), 1.53 (d, J=14.0 Hz, 9H), 1.39 (d, J=16.4 Hz, 3H), 1.10 (q, J=6.0 Hz, 6H), 0.54 (d, J=2.0 Hz, 3H)

$^{31}$P-NMR (162 MHz, CDCl$_3$): δ 47.6

(n) Synthesis of Metal Complex 9

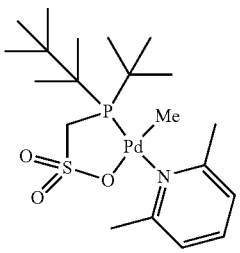

9

Metal Complex 9 was synthesized using the same method as in the synthesis of Metal Complex 1 indicated in the aforementioned sections (a) to (f) with the exception of substituting di-t-butyl phosphine chloride, which is a raw material of Metal Complex 1, with t-butyl (2,3,3-trimethyl-2-butyl) phosphine chloride (equal number of moles).

$^1$H-NMR (400 MHz, CDCl$_3$): δ 7.57 (t, J=7.7 Hz, 1H), 7.12 (d, J=7.7 Hz, 2H), 3.66 (dd, J=15.2, 8.0 Hz, 1H), 3.38 (dd, J=15.2, 9.2 Hz, 1H), 3.14 (s, 3H), 3.03 (s, 3H), 1.59 (d, J=14.0, 9H), 1.55-1.30 (m, 6H), 1.40 (s, 9H), 0.58 (s, 3H)

$^{31}$P-NMR (162 MHz, CDCl$_3$): δ 34.4

[Synthesis of Comparative Metal Complexes 1-4]

(o) Synthesis of Comparative Metal Complex 1

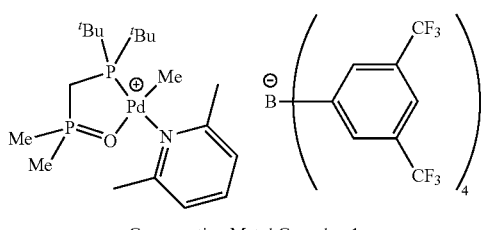

Comparative Metal Complex 1

Comparative Metal Complex 1 was synthesized in accordance with International Publication No. WO 2013/168626.

(p) Synthesis of Comparative Metal Complex 2

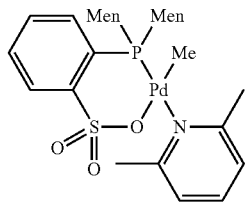

Comparative Metal Complex 2

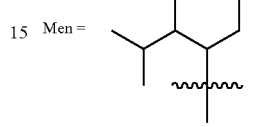

Men =

Comparative Metal Complex 2 was synthesized in accordance with Japanese Unexamined Patent Publication No. 2014-159540.

(q) Synthesis of Comparative Metal Complex 3

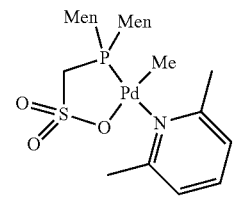

Comparative Metal Complex 3

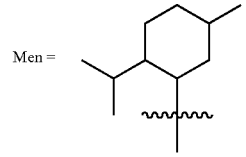

Men =

Comparative Metal Complex 3 was synthesized using the same method as in the synthesis of Metal Complex 1 by substituting di-(t-butyl) phosphine chloride, which is a raw material of Metal Complex 1, with dimenthyl phosphine chloride.

(r) Synthesis of Comparative Metal Complex 4

Comparative Metal Complex 4 was synthesized using the same method as in the synthesis of Metal Complex 1 with the exception of substituting di-t-butyl phosphine chloride, which is a raw material of Metal Complex 1, with di-(2',6'-dimethoxy-2-biphenyl) phosphine chloride (equal number of moles).

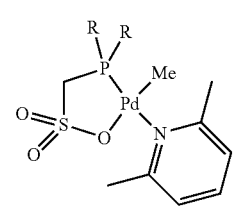

Comparative Metal Complex 4

-continued

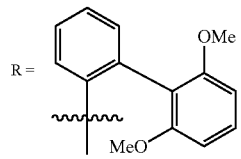

[Polymer Synthesis]

Olefin (co)polymerization was carried out using Metal Complexes 1-9 and Comparative Metal Complexes 1-4 synthesized according to the aforementioned methods. Polymerization conditions and polymerization results are respectively shown in Tables 1 and 2.

Catalyst concentration, productivity and catalytic activity were calculated according to the formulas indicated below.

$$\text{Catalyst concentration (mmol/L)} = \frac{\text{catalyst used (mmol)} \times 1000}{\text{Volume of solvent (mL)} + \text{Volume of polar group-containing monomer (mL)}}$$

$$\text{Productivity (g/mmol)} = \frac{\text{Yield of resulting polymer (g)}}{\text{Amount of metal complex catalyst used (mmol)}}$$

$$\text{Catalytic activity (g/mmol} \cdot \text{h)} = \frac{\text{Yield of resulting polymer (g)}}{\text{Amount of metal complex catalyst used (mmol)} \times \text{reaction time (h)}}$$

Example 1: Copolymerization of Allyl Acetate and Ethylene Using Metal Complex 1 (Preparation of Polymer 1)

Allyl acetate (11.6 mL, 108 mmol), as a monomer represented by general formula (1), and toluene (63.4 mL) were added into a 120 mL autoclave containing Metal Complex 1 (2.4 mg, 0.0050 mmol) under a nitrogen gas atmosphere. After filling with ethylene (4.0 MPa), the contents of autoclave were stirred for 1 hour at 80° C. After cooling to room temperature, the reaction solution in the autoclave was added to methanol (300 mL) to precipitate copolymer. The resulting copolymer was collected by filtration followed by washing with methanol and vacuum drying to obtain Polymer 1. The yield was 0.79 g. Productivity was calculated to be 158 g/mmol, and catalytic activity was calculated to be 158 g/mmol·h. The molecular weight of Polymer 1 was determined by size exclusion chromatography, number average molecular weight was calculated to be 124,000, weight average molecular weight was calculated to be 235,000 and Mw/Mn was 1.9. The allyl acetate content in the copolymer was determined by $^1$H-NMR measurement to be such that the molar ratio of ethylene:allyl acetate was 100:1.6 (molar fraction of allyl acetate: 1.6%).

Example 2: Copolymerization of Allyl Acetate and Ethylene Using Metal Complex 1 (Preparation of Polymer 2)

Allyl acetate (75 mL, 700 mmol) was added into a 120 mL autoclave containing Metal Complex 1 (4.7 mg, 0.010 mmol) under a nitrogen gas atmosphere. After filling with ethylene (1.1 MPa), the contents of autoclave were stirred for 24 hours at 65° C. After cooling to room temperature, the reaction solution in the autoclave was added to methanol (300 mL) to precipitate copolymer. The resulting copolymer was collected by filtration followed by washing with methanol and vacuum drying to obtain Polymer 2. The yield was 0.074 g. Productivity was calculated to be 7 g/mmol, and catalytic activity was calculated to be 0.31 g/mmol·h. The molecular weight of Polymer 2 was determined by size exclusion chromatography, number average molecular weight was calculated to be 1,800, weight average molecular weight was calculated to be 6,000 and Mw/Mn was 3.3. The allyl acetate content in the copolymer was determined by $^1$H-NMR measurement to be such that the molar ratio of ethylene:allyl acetate was 100:42.5 (molar fraction of allyl acetate: 29.8%).

Examples 3-7: Copolymerization of Allyl Acetate and Ethylene Using Metal Complex 1 (Preparation of Polymers 3-7)

Polymers 3-7 were obtained by copolymerizing allyl acetate and ethylene in the same manner as Example 2 with the exception of changing reaction temperature and ethylene pressure so that the allyl acetate content in the resulting copolymers was about 20% in terms of the molar fraction.

Example 8: Copolymerization of Allyl Acetate and Ethylene Using Metal Complex 2 (Preparation of Polymer 8)

Polymer 8 was obtained by copolymerizing allyl acetate and ethylene in the same manner as Example 1 with the exception of using Metal Complex 2 instead of Metal Complex 1.

Examples 9-10: Copolymerization of Allyl Acetate and Ethylene Using Metal Complex 2 (Preparation of Polymers 9-10)

Polymers 9-10 were obtained by copolymerizing allyl acetate and ethylene in the same manner as Example 2 with the exception of using Metal Complex 2 instead of Metal Complex 1, and changing the reaction temperature and ethylene pressure so that the allyl acetate content in the resulting copolymers was about 20% in terms of the molar fraction.

Examples 11-17: Copolymerization of Allyl Acetate and Ethylene Using Metal Complexes 3-9 (Preparation of Polymers 11-17)

Polymers 1-17 were obtained by copolymerizing allyl acetate and ethylene in the same manner as Example 1 with the exception of using any of the Metal Complexes 3-9 instead of Metal Complex 1.

Comparative Examples 1-4: Copolymerization of Allyl Acetate and Ethylene Using Comparative Metal Complex 1 (Preparation of Comparative Polymers 1-4)

Comparative Polymers 1-4 were obtained by copolymerizing allyl acetate and ethylene in the same manner as Example 2 with the exception of using Comparative Metal Complex 1 instead of Metal Complex 1 and changing the reaction temperature and ethylene pressure so that the allyl acetate content in the resulting copolymers was about 20% in terms of the molar fraction.

Comparative Examples 5-7: Copolymerization of Allyl Acetate and Ethylene Using Comparative Metal Complex 2 (Preparation of Comparative Polymers 5-7)

Comparative Polymers 5-7 were obtained by copolymerizing allyl acetate and ethylene in the same manner as Example 2 with the exception of using Comparative Metal Complex 2 instead of Metal Complex 1 and changing the reaction temperature and ethylene pressure so that the allyl acetate content in the resulting copolymers was about 20% in terms of the molar fraction.

Comparative Examples 8-10: Copolymerization of Allyl Acetate and Ethylene Using Comparative Metal Complex 3 (Preparation of Comparative Polymers 8-10)

Comparative Polymers 8-10 were obtained by copolymerizing allyl acetate and ethylene in the same manner as Example 2 with the exception of using Comparative Metal Complex 3 instead of Metal Complex 1 and changing the reaction temperature and ethylene pressure so that the allyl acetate content in the resulting copolymers was about 20% in terms of the molar fraction.

Comparative Example 11: Copolymerization of Allyl Acetate and Ethylene Using Comparative Metal Complex 4 (Preparation of Comparative Polymer 4)

Comparative Polymer 11 was obtained by copolymerizing allyl acetate and ethylene in the same manner as Example 1 with the exception of using Comparative Metal Complex 4 instead of Metal Complex 1.

| Example | Catalyst Type | Catalyst mg | Catalyst mmol | Ethylene MPa | Allyl acetate of general formula (1) mL | Solvent Type | Solvent mL | Catalyst concentration mmol/L | Reaction temperature °C | Reaction time h |
|---|---|---|---|---|---|---|---|---|---|---|
| Example 1 | Metal complex 1 | 2.4 | 0.0050 | 4.0 | 11.6 | Toluene | 63.4 | 0.067 | 80 | 1 |
| Example 2 | Metal complex 1 | 4.7 | 0.0100 | 1.1 | 75.0 | None | 0 | 0.130 | 65 | 24 |
| Example 3 | Metal complex 1 | 4.7 | 0.0100 | 1.6 | 75.0 | None | 0 | 0.130 | 80 | 24 |
| Example 4 | Metal complex 1 | 4.7 | 0.0100 | 2.1 | 75.0 | None | 0 | 0.130 | 100 | 24 |
| Example 5 | Metal complex 1 | 4.7 | 0.0100 | 2.4 | 75.0 | None | 0 | 0.130 | 120 | 24 |
| Example 6 | Metal complex 1 | 4.7 | 0.0100 | 3.1 | 75.0 | None | 0 | 0.130 | 140 | 24 |
| Example 7 | Metal complex 1 | 4.7 | 0.0100 | 3.6 | 75.0 | None | 0 | 0.130 | 160 | 24 |
| Example 8 | Metal complex 2 | 3.1 | 0.0050 | 4.0 | 11.6 | Toluene | 63.4 | 0.067 | 80 | 1 |
| Example 9 | Metal complex 2 | 6.2 | 0.0100 | 1.9 | 75.0 | None | 0 | 0.130 | 65 | 24 |
| Example 10 | Metal complex 2 | 6.2 | 0.0100 | 4.5 | 75.0 | None | 0 | 0.130 | 140 | 24 |
| Example 11 | Metal complex 3 | 2.5 | 0.0050 | 4.0 | 11.6 | Toluene | 63.4 | 0.067 | 80 | 1 |
| Example 12 | Metal complex 4 | 3.1 | 0.0050 | 4.0 | 11.6 | Toluene | 63.4 | 0.067 | 80 | 1 |
| Example 13 | Metal complex 5 | 2.6 | 0.0050 | 4.0 | 11.6 | Toluene | 63.4 | 0.067 | 80 | 1 |
| Example 14 | Metal complex 6 | 2.9 | 0.0050 | 4.0 | 11.6 | Toluene | 63.4 | 0.067 | 80 | 1 |
| Example 15 | Metal complex 7 | 2.6 | 0.0050 | 4.0 | 11.6 | Toluene | 63.4 | 0.067 | 80 | 1 |
| Example 16 | Metal complex 8 | 2.5 | 0.0050 | 4.0 | 11.6 | Toluene | 63.4 | 0.067 | 80 | 1 |
| Example 17 | Metal complex 9 | 2.5 | 0.0050 | 4.0 | 11.6 | Toluene | 63.4 | 0.067 | 80 | 1 |
| Comp. Ex. 1 | Comp. metal complex 1 | 13.3 | 0.0100 | 3.0 | 75.0 | None | 0 | 0.130 | 65 | 24 |
| Comp. Ex. 2 | Comp. metal complex 1 | 13.3 | 0.0100 | 4.2 | 75.0 | None | 0 | 0.130 | 80 | 24 |
| Comp. Ex. 3 | Comp. metal complex 1 | 13.3 | 0.0100 | 5.2 | 75.0 | None | 0 | 0.130 | 100 | 24 |
| Comp. Ex. 4 | Comp. metal complex 1 | 13.3 | 0.0100 | 6.0 | 75.0 | None | 0 | 0.130 | 120 | 24 |
| Comp. Ex. 5 | Comp. metal complex 2 | 6.9 | 0.0100 | 0.5 | 75.0 | None | 0 | 0.130 | 65 | 24 |
| Comp. Ex. 6 | Comp. metal complex 2 | 6.9 | 0.0100 | 0.7 | 75.0 | None | 0 | 0.130 | 80 | 24 |
| Comp. Ex. 7 | Comp. metal complex 2 | 6.9 | 0.0100 | 1.0 | 75.0 | None | 0 | 0.130 | 100 | 24 |
| Comp. Ex. 8 | Comp. metal complex 3 | 6.3 | 0.0100 | 0.5 | 75.0 | None | 0 | 0.130 | 65 | 24 |
| Comp. Ex. 9 | Comp. metal complex 3 | 6.3 | 0.0100 | 2.0 | 75.0 | None | 0 | 0.130 | 120 | 24 |
| Comp. Ex. 10 | Comp. metal complex 3 | 6.3 | 0.0100 | 3.5 | 75.0 | None | 0 | 0.130 | 160 | 24 |
| Comp. Ex. 11 | Comp. metal complex 4 | 3.9 | 0.0050 | 4.0 | 11.6 | Toluene | 63.4 | 0.067 | 80 | 1 |

| Example | Polymer No. | Yield g | Productivity g/mmol | Catalytic activity g/(mmol·h) | Mn | Mw | Mw/Mn | Allyl acetate unit content mol % |
|---|---|---|---|---|---|---|---|---|
| Example 1 | 1 | 0.790 | 158 | 158.00 | 124000 | 235000 | 1.9 | 1.60 |
| Example 2 | 2 | 0.074 | 7 | 0.31 | 1800 | 6000 | 3.3 | 29.80 |
| Example 3 | 3 | 0.130 | 13 | 0.54 | 2500 | 8900 | 3.6 | 26.80 |
| Example 4 | 4 | 0.310 | 31 | 1.30 | 2600 | 9700 | 3.7 | 22.60 |
| Example 5 | 5 | 1.250 | 125 | 5.20 | 1900 | 6500 | 3.4 | 23.60 |
| Example 6 | 6 | 2.360 | 236 | 9.80 | 1600 | 5400 | 3.4 | 22.30 |
| Example 7 | 7 | 4.710 | 471 | 19.60 | 1200 | 4000 | 3.3 | 21.60 |
| Example 8 | 8 | 0.680 | 136 | 136.00 | 102000 | 195000 | 1.9 | 1.80 |
| Example 9 | 9 | 0.360 | 36 | 1.50 | 4700 | 21000 | 4.5 | 19.30 |
| Example 10 | 10 | 2.360 | 236 | 9.80 | 1400 | 5400 | 3.9 | 17.70 |
| Example 11 | 11 | 1.080 | 715 | 215.00 | 134000 | 295000 | 2.2 | 1.30 |
| Example 12 | 12 | 0.460 | 91 | 91.00 | 78000 | 201000 | 2.6 | 1.30 |
| Example 13 | 13 | 0.950 | 191 | 191.00 | 112000 | 261000 | 2.3 | 1.30 |
| Example 14 | 14 | 1.030 | 205 | 205.00 | 112000 | 279000 | 2.5 | 1.30 |

-continued

| | | | | | | | | |
|---|---|---|---|---|---|---|---|---|
| Example 15 | 15 | 0.430 | 86 | 86.00 | 105000 | 224000 | 2.1 | 0.65 |
| Example 16 | 16 | 0.790 | 157 | 157.00 | 93000 | 248000 | 2.7 | 0.94 |
| Example 17 | 17 | 0.920 | 183 | 183.00 | 134000 | 453000 | 3.4 | 0.60 |
| Comp. Ex. 1 | Comp. 1 | 0.420 | 42 | 1.80 | 4000 | 17000 | 4.2 | 23.00 |
| Comp. Ex. 2 | Comp. 2 | 1.000 | 100 | 4.20 | 5800 | 17000 | 2.8 | 18.50 |
| Comp. Ex. 3 | Comp. 3 | 0.950 | 95 | 4.00 | 3800 | 11000 | 2.8 | 17.40 |
| Comp. Ex. 4 | Comp. 4 | 0.370 | 37 | 1.50 | 2400 | 7800 | 3.2 | 17.20 |
| Comp. Ex. 5 | Comp. 5 | 0.360 | 36 | 1.50 | 45000 | 87000 | 1.9 | 18.00 |
| Comp. Ex. 6 | Comp. 6 | 0.260 | 26 | 1.10 | 24000 | 51000 | 7.1 | 18.90 |
| Comp. Ex. 7 | Comp. 7 | 0.130 | 13 | 0.54 | 21000 | 37000 | 1.8 | 19.70 |
| Comp. Ex. 8 | Comp. 8 | 0.020 | 2 | 0.08 | 2300 | 12000 | 5.3 | 19.40 |
| Comp. Ex. 9 | Comp. 9 | Not obtained | — | — | — | — | — | — |
| Comp. Ex. 10 | Comp. 10 | Not obtained | — | — | — | — | — | — |
| Comp. Ex. 11 | Comp. 11 | 0.160 | 32 | 32.00 | 6300 | 14000 | 2.3 | 0.49 |

A graph in which productivity is plotted versus reaction temperature for the results of polymerization of Examples 2-7, for which polymerization was carried out using Metal Complex 1 while changing the reaction temperature, and Comparative Examples 1-10, for which polymerization was carried out using Comparative Metal Complex 1, Comparative Metal Complex 2 or Comparative Metal Complex 3 while changing the reaction temperature, is shown in FIG. 1.

According to the results for Examples 2-7 and Examples 9-10, Metal Complex 1 and Metal Complex 2 of the present invention were determined to demonstrate improved productivity and catalytic activity as temperature conditions rose and have high heat resistance. Based on the results for Comparative Examples 1-4 and Comparative Examples 5-7, in the case of having used Comparative Metal Complex 1 and Comparative Metal Complex 2, productivity and catalytic activity peaked at 80° C. and 65° C. respectively, after which productivity and catalytic activity decreased at higher temperatures. Based on the results of Comparative Examples 8-10, in the case of having used Comparative Metal Complex 3, hardly any polymer was obtained during polymerization at 120° C. or higher.

On the basis of the above, the metal complex catalyst of the present invention was determined to have high heat resistance in comparison with conventional metal complex catalysts. Namely, the catalyst demonstrates high catalytic activity and productivity without decomposing or losing activity even under high temperature conditions, and as a result, enables production costs to be reduced.

The invention claimed is:

1. A catalyst for olefin polymerization containing a metal complex represented by the following general formula (C1):

(C1)

wherein, M represents Pd, X represents a phosphorous atom (P) or arsenic atom (As), Y represents a divalent group selected from a substituted or unsubstituted methylene group (—CH$_2$—), substituted or unsubstituted imino group (—NH—), oxy group (—O—) or substituted or unsubstituted silylene group (—SiH$_2$—), R$^5$ represents a substituent selected from the group consisting of a hydrogen atom, halogen atom, hydrocarbon group having 1 to 30 carbon atoms, hydrocarbon group having 1 to 30 carbon atoms substituted with a halogen atom, hydrocarbon group having 2 to 30 carbon atoms substituted with an alkoxy group having 1 to 10 carbon atoms, hydrocarbon group having 7 to 30 carbon atoms substituted with an aryloxy group having 6 to 20 carbon atoms, hydrocarbon group having 3 to 30 carbon atoms substituted with an amido group having 2 to 10 carbon atoms, alkoxy group having 1 to 30 carbon atoms, aryloxy group having 6 to 30 carbon atoms, and acyloxy group having 2 to 10 carbon atoms, R$^6$ and R$^7$ respectively and independently represent an alkoxy group, aryloxy group, silyl group, amino group or hydrocarbon group having 1 to 120 carbon atoms optionally substituted with one or more substituents selected from a halogen atom, alkoxy group or aryloxy group, at least one of R$^6$ and R$^7$ represents a tertiary alkyl group represented by general formula (2):

(2)

wherein, R$^8$, R$^9$ and R$^{10}$ respectively and independently represent a hydrocarbon group having 1 to 30 carbon atoms, R$^8$, R$^9$ and R$^{10}$ may respectively bond to form a ring structure, and in the formula, bonds between the carbon atom and X in general formula (C1) are also indicated, R$^6$ and R$^7$ may respectively bond to form a ring structure, L represents an electron donating ligand, and q represents ½, 1 or 2.

2. The catalyst for olefin polymerization according to claim 1, wherein R$^6$ and R$^7$ respectively and independently represent a tertiary alkyl group represented by general formula (2).

3. The catalyst for olefin polymerization according to claim 1, wherein the tertiary alkyl group represented by general formula (2) is a t-butyl group, 1-adamantyl group, 2-methyl-2-butyl group, 2-methyl-2-pentyl group, 2-benzyl-2-propyl group, 2,5-dimethyl-2-hexyl group, 3-methyl-3-pentyl group or 2,3,3-trimethyl-2-butyl group.

4. The catalyst for olefin polymerization according to claim 1, wherein Y in general formula (C1) represents a methylene group.

5. The catalyst for olefin polymerization according to claim 1, wherein R$^5$ in general formula (C1) represents a methyl group, benzyl group, methoxy group, 2-acetoamidophenyl group or acetyloxy group.

6. A production method comprising conducting polymerization in the presence of a metal complex represented by general formula (C1) as a polymerization catalyst:

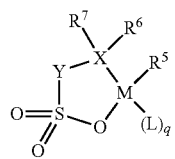

(C1)

wherein, the symbols in the formula having the same meanings as the description of claim 1, for producing polyethylene, a copolymer of ethylene and an olefin having a polar group represented by general formula (1):

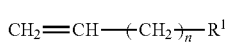

(1)

wherein, $R^1$ represents a substituent selected from the group consisting of a hydroxy group, alkoxy group having 1 to 10 carbon atoms, aryloxy group having 6 to 20 carbon atoms, acyl group having 2 to 10 carbon atoms, ester group having 2 to 10 carbon atoms, oxycarbonyl group: R—O—(C=O)—, where R represents an organic group, acyloxy group having 2 to 10 carbon atoms, amino group, substituted amino group having 1 to 12 carbon atoms, substituted amido group having 2 to 12 carbon atoms, substituted pyridyl group having 5 to 10 carbon atoms, substituted pyrrolidyl group having 4 to 10 carbon atoms, substituted piperidyl group having 5 to 10 carbon atoms, substituted hydrofuryl group having 4 to 10 carbon atoms, substituted imidazolyl group having 4 to 10 carbon atoms, mercapto group, alkylthio group having 1 to 10 carbon atoms, arylthio group having 6 to 10 carbon atoms, epoxy group and a halogen atom, and n represents 0 or an arbitrary integer selected from 1 to 6, or a copolymer of ethylene, an olefin having a polar group represented by the aforementioned formula (1) and another monomer.

7. The production method according to claim 6, wherein n in general formula (1) represents 0.

8. The production method according to claim 6, wherein n in general formula (1) represents 1.

9. The production method according to claim 6, wherein $R^6$ and $R^7$ respectively and independently represent a tertiary alkyl group represented by general formula (2).

10. The production method according to claim 6, wherein the tertiary alkyl group represented by general formula (2) is a t-butyl group, 1-adamantyl group, 2-methyl-2-butyl group, 2-methyl-2-pentyl group, 2-benzyl-2-propyl group, 2,5-dimethyl-2-hexyl group, 3-methyl-3-pentyl group or 2,3,3-trimethyl-2-butyl group.

11. The production method according to claim 6, wherein Y in general formula (C1) represents a methylene group.

12. The production method according to claim 6, wherein a polymerization temperature is 100-180° C.

13. The production method according to claim 6, wherein $R^5$ in general formula (C1) represents a methyl group, benzyl group, methoxy group, 2-acetoamidophenyl group or acetyloxy group.

* * * * *